United States Patent
Perryman

(10) Patent No.: US 9,115,937 B2
(45) Date of Patent: Aug. 25, 2015

(54) THERMAL ENERGY STORAGE AND DELIVERY SYSTEM

(76) Inventor: Virgil Dewitt Perryman, Sterrett, AL (US)

( * ) Notice: Subject to any disclaimer, the term of this patent is extended or adjusted under 35 U.S.C. 154(b) by 718 days.

(21) Appl. No.: 13/361,877

(22) Filed: Jan. 30, 2012

(65) Prior Publication Data

US 2013/0153169 A1    Jun. 20, 2013

Related U.S. Application Data

(63) Continuation-in-part of application No. 13/326,454, filed on Dec. 15, 2011, now abandoned.

(51) Int. Cl.
*F28D 20/02* (2006.01)
*F28D 20/00* (2006.01)

(52) U.S. Cl.
CPC ...... *F28D 20/021* (2013.01); *F28D 2020/0082* (2013.01); *Y02E 60/145* (2013.01)

(58) Field of Classification Search
CPC .. F25B 2400/24; F28D 20/021; F28D 20/026
USPC ................. 165/10, 902; 62/59, 437
See application file for complete search history.

(56) References Cited

U.S. PATENT DOCUMENTS

| | | | |
|---|---|---|---|
| 1,123,033 A | 12/1914 | Stobie | |
| 2,362,351 A | 11/1944 | Burmeister et al. | |
| 2,562,753 A | 7/1951 | Trost | |
| 2,690,880 A | 10/1954 | Chatelain | |
| 3,058,674 A | 10/1962 | Kocher | |
| 4,111,159 A | 9/1978 | Okuno et al. | |
| 4,248,387 A | 2/1981 | Andrews | |
| 4,280,664 A | 7/1981 | Jackson et al. | |
| 4,350,326 A | 9/1982 | Fujii et al. | |
| 4,553,704 A | 11/1985 | Wilson et al. | |
| 5,012,619 A | 5/1991 | Knepprath et al. | |
| 5,305,821 A * | 4/1994 | Weingartner | 165/10 |
| 5,397,104 A | 3/1995 | Roth | |
| 6,096,260 A | 8/2000 | Schirk | |
| 6,767,382 B2 | 7/2004 | Stratigos et al. | |
| 6,877,549 B2 * | 4/2005 | Hirano | 165/10 |

(Continued)

FOREIGN PATENT DOCUMENTS

| | | |
|---|---|---|
| DE | 328386 C | 10/1920 |
| FR | 778415 A | 3/1935 |

(Continued)

OTHER PUBLICATIONS

"Dry granulation—a new sustainable process for full value recovery from molten slags," CSIRO, dated Dec. 23, 2010 (http://www.csiro.au/Organisation-Structure/Divisions/Process-Science-and-Engineering/Dry-Slag-Granulation.aspx—last accessed Dec. 15, 2011).

(Continued)

*Primary Examiner* — Mohammad M Ali
*Assistant Examiner* — Raheena Rehman
(74) *Attorney, Agent, or Firm* — LeonardPatel PC

(57) ABSTRACT

A thermal energy storage and delivery system is disclosed. A core includes a thermal storage medium and a thermal transfer medium transports thermal energy to and from the core. The core may be surrounded by multiple layers, where each layer is less dense the closer the layer is to the outside of the thermal storage and delivery system.

19 Claims, 14 Drawing Sheets

(56) References Cited

U.S. PATENT DOCUMENTS

| | | | |
|---|---|---|---|
| 6,889,751 B1* | 5/2005 | Lukas et al. | 165/10 |
| 6,971,594 B1 | 12/2005 | Polifka | |
| 8,617,458 B2 | 12/2013 | Herbert et al. | |
| 2007/0175609 A1 | 8/2007 | Christ et al. | |
| 2007/0209365 A1* | 9/2007 | Hamer et al. | 60/648 |
| 2009/0294094 A1* | 12/2009 | Suzuki et al. | 165/10 |
| 2011/0030915 A1* | 2/2011 | Best | 165/10 |
| 2011/0036537 A1* | 2/2011 | Seki | 165/10 |
| 2011/0226440 A1* | 9/2011 | Bissell et al. | 165/10 |
| 2011/0290445 A1* | 12/2011 | Shelef et al. | 165/6 |

FOREIGN PATENT DOCUMENTS

| | | | |
|---|---|---|---|
| JP | 2001280872 A | 10/2001 | |
| JP | 2001355009 A | 12/2001 | |
| JP | 2009030912 A | 2/2009 | |
| JP | 2009204231 A | 9/2009 | |
| JP | 2011058750 A | 3/2011 | |
| KR | 100896580 B1 | 5/2009 | |

OTHER PUBLICATIONS

"Thermodynamic equilibrium," Wikipedia, dated Dec. 15, 2011 (en.wikipedia.org/wiki/Thermodynamic_equilibrium—last accessed Dec. 15, 2011).

Fedden, Angelinda D., "Graphitized Carbon Foam with Phase Change Material," Air Force Institute of Technology, Department of the Air Force Air University, Mar. 23, 2006.

Written Opinion of the International Search Authority dated Mar. 26, 2013, in PCT Application No. PCT/US12/69343.

Written Opinion of the International Searching Authority issued in PCT Application No. PCT/US13/23639 on May 8, 2013.

Non-final Office Action issued in U.S. Appl. No. 13/326,454 on Jan. 16, 2014.

* cited by examiner

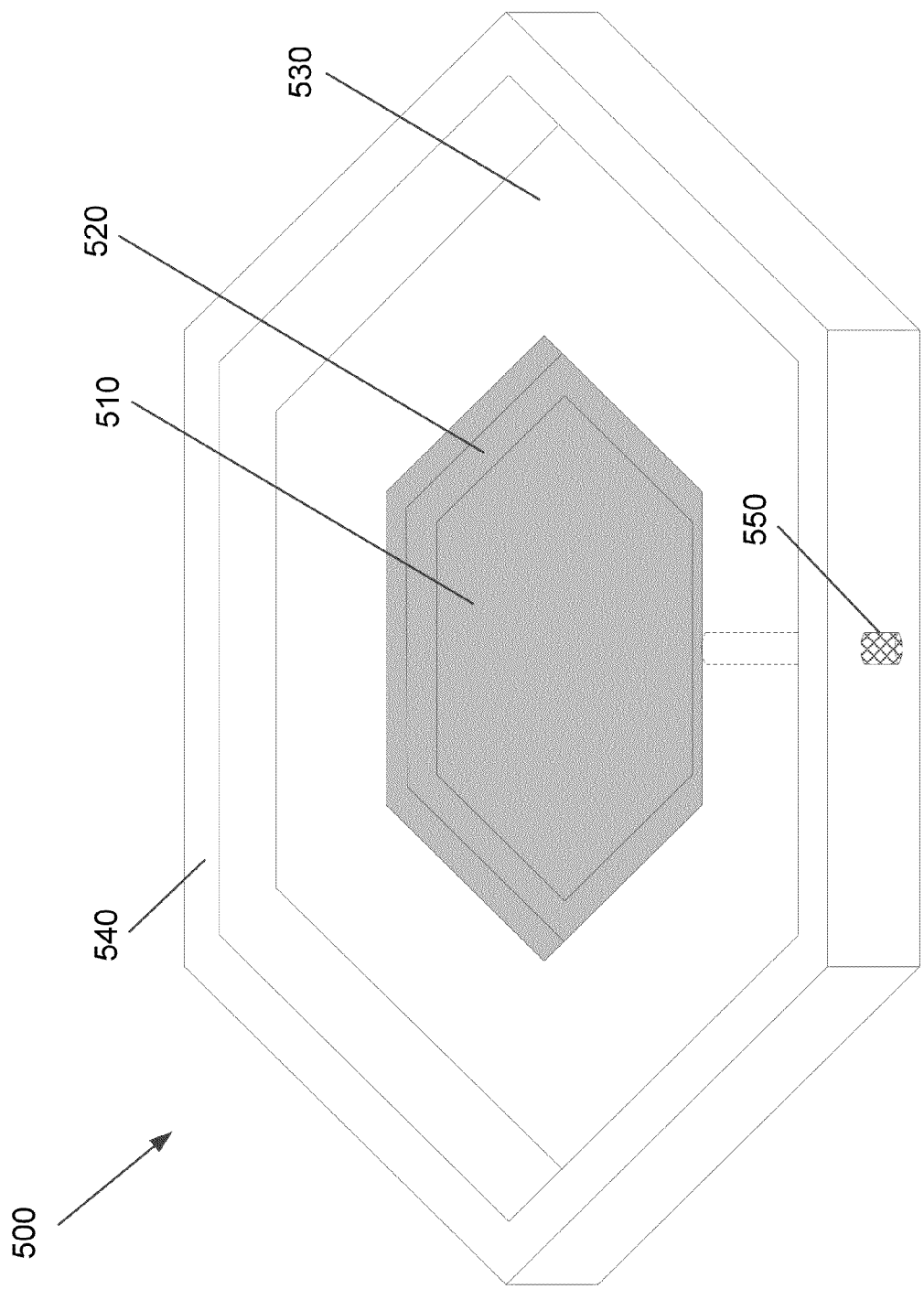

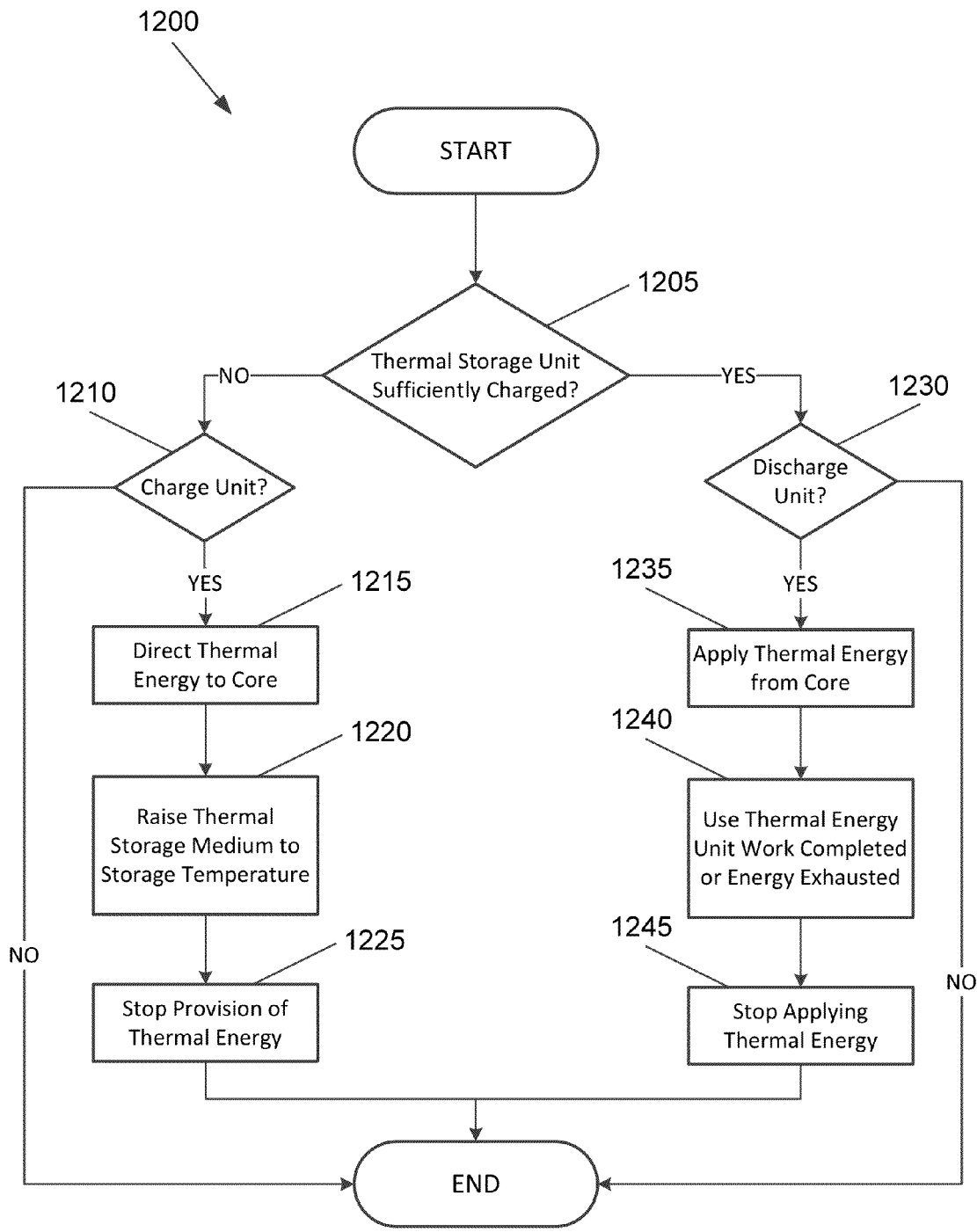

THERMAL ENERGY STORAGE AND DELIVERY SYSTEM

CROSS REFERENCE TO RELATED APPLICATIONS

This application is a continuation-in-part of, and claims priority to, U.S. patent application Ser. No. 13/326,454, filed Dec. 15, 2011. The subject matter of this earlier filed application is hereby incorporated by reference in its entirety.

FIELD

The present invention generally relates to thermal energy storage and delivery, and more specifically, to a thermal storage unit that is configured to store heat from a heat source and release the stored heat energy for use in various applications.

BACKGROUND

The storage of energy is a difficult issue that plagues high energy consumption industries and the electricity production industry, among others. For instance, conventional systems do not perform well for storing wind-generated electrical energy, solar-generated electrical energy, or electrical energy generated by any other source, for that matter. Accordingly, several states in the United States, as well as the United States Department of Defense and Department of Energy, have instituted programs to develop energy storage capabilities.

With respect to industrial energy creation, industries such as steel, aluminum, and cement dump millions of thermal megawatts into the atmosphere hourly, which is simply wasted. With respect to electrical power generation, demand for power is not always constant, but instead varies considerably and experiences peaks and troughs. There is generally little flexibility in the level of electricity generation and thus, when there is a peak in demand, auxiliary power generation schemes have to be deployed. These auxiliary power generation schemes tend to be less efficient than the primary generation system, and generators such as gas turbines may have to be powered up for half an hour or more to reach optimal electrical generation capabilities, and then be run for hours in order to comply with regulations. In addition, when there is a trough in demand, power may have to be dumped. Accordingly, a system that can store thermal energy and put the stored thermal energy to productive use may be beneficial.

SUMMARY

Certain embodiments of the present invention may provide solutions to the problems and needs in the art that have not yet been fully identified, appreciated, or solved by current energy storage technologies. For example, some embodiments of the present invention facilitate high temperature storage of thermal energy that can be subsequently released for productive use.

In one embodiment, an apparatus includes a core including a thermal storage medium and a thermal transfer medium that transports thermal energy to and from the core. The core includes a plurality of trays including the thermal storage medium. The plurality of trays is configured to store thermal energy.

In another embodiment, a thermal storage unit includes a core including a thermal storage medium and a plurality of layers surrounding the core. The innermost layer has the highest density and each successive layer has a lower density than the layer it surrounds. The thermal storage unit also includes a thermal transfer medium that passes through the plurality of layers and is configured to deliver thermal energy to, and extract thermal energy from, the thermal storage medium.

In yet another embodiment, an apparatus includes a core including a plurality of trays that contain a thermal storage medium and a plurality of layers surrounding the core. Each successive layer away from the core has less refractory and more insulating properties than the preceding layer, such that an innermost layer has the most refractory properties and an outermost layer has the most insulative properties. The apparatus also includes a pipe including a thermal transfer medium that is configured to transfer heat to and from the core.

BRIEF DESCRIPTION OF THE DRAWINGS

For a proper understanding of the invention, reference should be made to the accompanying figures. These figures depict only some embodiments of the invention and are not limiting of the scope of the invention. Regarding the figures:

FIG. 5A illustrates a perspective view of a bottom side of a thermal storage cell, according to an embodiment of the present invention.

FIG. 12 is a flowchart illustrating a method for charging and discharging a thermal storage unit, according to an embodiment of the present invention.

DETAILED DESCRIPTION OF THE EMBODIMENTS

Figure 1:
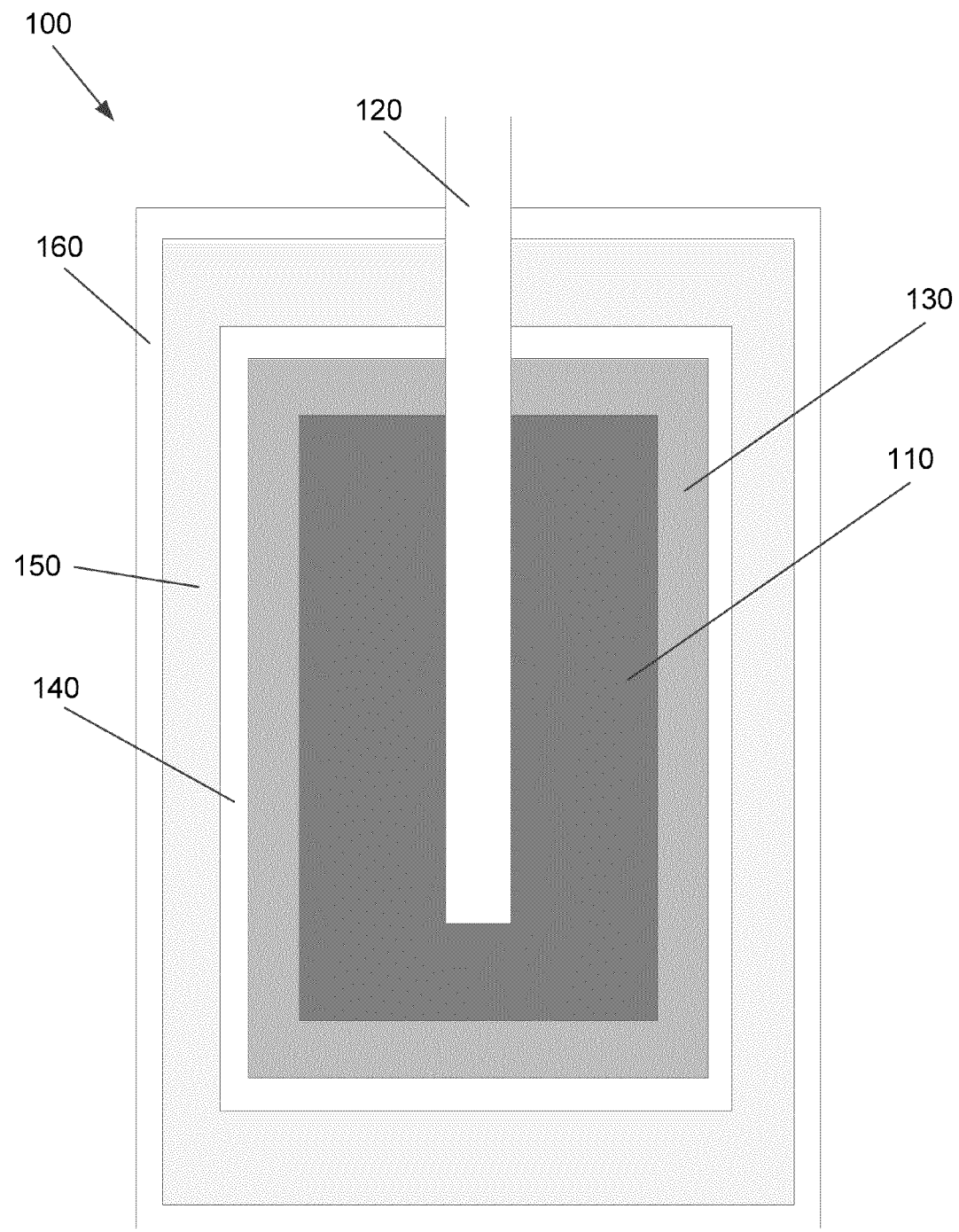
FIG. 1 illustrates a basic conceptual diagram of a thermal storage unit, according to an embodiment of the present invention.

It will be readily understood that the components of the present invention, as generally described and illustrated in the figures herein, may be arranged and designed in a wide variety of different configurations. Thus, the following detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Some embodiments of the present invention provide a thermal storage unit that can economically store and deliver thermal energy. The thermal energy may be recovered, for example, from industrial or grid power generation processes. Such a thermal storage unit may provide reliability for wind and solar energy generation, as well as provide capacitance that eliminates or buffers spikes and sudden drop-offs in demand for power. Thermal storage may allow alternative energy sources to achieve grid parity with dirtier fuel sources such as coal and natural gas. Storage of thermal energy also provides solutions for grid stability and economic viability for many high energy industries.

Many embodiments of the present invention may conceptually mimic heat storage within large celestial objects such as the Earth. The Earth, for example, is composed of a metallic core that has is believed to include iron, nickel, and other metals with a high specific heat capacity. This core is encased in a dense rocky layer, which likewise has a high specific heat capacity. Successive layers are less dense and have a lower specific heat capacity, and the outer layers act as insulating layers. The outer surface is mostly covered by water and stone of moderate density. Highly viscous or partially molten rock at temperatures between 650° C. to 1,300° C. (1,202° F. to 2,192° F.) is postulated to exist everywhere beneath the Earth's surface at depths of 50 to 60 miles (80 to 100 kilometers). The temperature at the Earth's center, nearly 4,000 miles (6,400 km) deep, is estimated to be between 5650K and 6000K. The temperature between the Earth's core and the surface has achieved a thermal equilibrium, or balance, that has allowed the planet to hold high levels of heat in its core for over four billion years, and will continue to do so long after the life of a majority of the radioactive material that has introduced additional thermal energy into the system since the Earth's formation.

Similarly, in some embodiments of the present invention, a central core includes a combination of molten metals and ceramics that have a high specific heat capacity. These materials are generally selected for their high specific heat capacity and stability at high temperatures, as well as resistance to thermal shock. The core materials may be arranged and layered in trays, for example, allowing phase change without becoming a solid mass that may hinder the efficient operation of the thermal transfer medium. In some embodiments, the core may include a thermal storage medium such as nickel (Ni) and a thermal transfer medium such as a graphite composite material (e.g., PocoFoam®). In certain embodiments, the core may include a network of pipes made of high density graphite or silicon carbide (SiC) filled with a graphite foam composite saturated with argon or other inert gases. These pipes may be distributed like arteries throughout the core of the thermal storage unit. This rate of energy exchange can be controlled by increasing the thermal conducting volume of the arterial network of encased graphite, inert gas, and boron nitride (BN) tubes and pipes. Such embodiments may be controlled by gates that engage or disengage sections of the arterial network to modify the amount of energy that is being stored or extracted. BN may be used to enhance thermal conductivity of the interacting surfaces, and may be hexagonal in some cases. The thermal storage unit may employ two independent circuits in some embodiments—one for absorbing and storing thermal energy and one for extracting the energy. The two circuits may operate simultaneously, allowing energy to be extracted and delivered to a load, while at the same time collecting and storing energy.

The core may be surrounded by dense layers of ceramics that have a high specific heat capacity, where subsequent layers have a progressively lower specific heat capacity, store less energy, and act as both refractory and insulation to varying degrees. The outermost layers provide insulation and isolate the thermal energy within. Any number of layers may be used with various properties, depending on design choice. The core material is generally selected for its specific heat capacity and is generally limited to the temperature at which the core material exhibits phase change to a gaseous state. The higher the temperature of the core, the more energy the thermal storage unit can store. The increase in energy with temperature is nonlinear—in fact, exponential. The total storage time depends on the intended operating temperature of the thermal storage unit and the amount of energy that is extracted from the unit. The intended operating temperature governs the total energy that can be stored.

Like the Earth, the outermost layers of the thermal storage unit do not totally contain the energy, but rather allow thermal equilibrium to be established between the extremely hot core and the outside surface of the thermal storage unit. In some embodiments, the core and each subsequent layer may absorb the maximum amount of energy at the limit of the specific heat capacity at the maximum temperature of the stable condition of their respective materials. The total storage is generally limited to the melting temperatures or disassociating temperatures of the ceramics or graphite and the boiling temperatures of the ceramics and metals in the core.

Exchanges within the thermal storage unit, as well as between the thermal storage unit and the outside, are controlled by intensive parameters. Intensive parameters are those that do not depend on the size or amount of material in the system. For example, temperature controls heat exchanges. When storing thermal energy, a local thermodynamic equilibrium (LTE) is established within the thermal storage unit. LTE means that intensive parameters are varying in space and time so slowly that for any single point within the system, it can be assumed that a given neighborhood about that point is in a state of thermodynamic equilibrium.

By way of example, LTE may be said to exist in a glass of water that contains a melting ice cube. While the temperature inside the glass can be defined at any given point, the temperature will be colder the closer the point is to the ice cube. The energy will be distributed according to the Maxwell-Boltzman distribution for the given temperature as follows:

$$\frac{N_i}{N} = \frac{g_i^{(-E_i/kT)}}{\Sigma_j g_j^{(-E_j/kT)}}$$

where i is the microstate, $E_i$ is the energy level of microstate i, T is the equilibrium temperature of the system, $g_i$ is the degeneracy factor, or number of degenerate microstates that have the same energy level, k is the Boltzmann constant, $N_i$ is the number of molecules at equilibrium temperature T in a state i that has energy $E_i$ and degeneracy $g_i$, and N is the total number of molecules in the system. LTE requires that each small locality changes slowly enough to practically sustain the local Maxwell-Boltzmann distribution of molecular velocities.

When the thermal storage unit is sealed and not in a state of receiving or discharging energy, the overall unit is in a state of quasistatic equilibrium. Quasistatic equilibrium is a quasi-balanced state near to thermodynamic equilibrium where a sufficiently slow transition from one thermodynamic equilibrium state to another occurs such that the state of the system is close to thermodynamic equilibrium. In such a state, the system reaches equilibrium much faster (nearly instantaneously) than its physical parameters vary.

When receiving or discharging energy, the thermal storage unit is in a non-equilibrium state. A constant flux of energy is either entering (charging mode) or leaving (discharging mode) the thermal storage unit in such a state. In some embodiments, both charging and discharging may occur simultaneously. In the charging mode, the thermal storage medium in the core of the thermal storage unit will typically be transitioning to a liquid state at sufficiently high temperatures, whereas in the discharging mode, the thermal storage medium will typically be transitioning to a solid state.

Some embodiments of the present invention enjoy significant advantages over conventional energy storage systems, such as chemical batteries. For instance, some embodiments store high density thermal energy that has a temperature in excess of 1000° C. in a compact containment structure. Anywhere from a few kilowatts up to hundreds of megawatts of thermal energy may be stored and/or released per hour in various combinations and configurations. In some embodiments, thermal energy can be retained for over 72 hours or longer with minor losses (less than 10 watts of thermal energy per cubic meter per 24 hour period). In other embodiments, thermal energy may be stored in excess of six months. The amount of time that thermal energy can be stored is a function of the architecture of the unit and the materials that are used.

Some embodiments of the thermal storage unit are modular and can be clustered as cells that are part of a larger thermal storage system. In this way, the storage capacity may be increased and the charging and discharging volume and rates can be adapted to various applications and requirements. As a cluster of cells, the cells can be configured in series or in parallel to vary the volume of stored energy, the rate of energy storage and discharge, and the duration for which energy is stored. From a conceptual standpoint, the cell cluster configuration may be similar in operation to electrochemical batteries and the cells can be connected in parallel or in series since as the specific heat capacity is reached for the core of one thermal storage unit, the thermal energy will normally migrate to a location with a lower temperature, such as another thermal storage unit if properly configured. The connections can facilitate this movement (thermal energy migration) and set the cells up in a way that cells fill or discharge one after another (in series) or in a way that multiple cells are charged or discharged simultaneously (in parallel).

Some embodiments of the present invention are solid state and the only moving parts are externally located switches, controllers, and the like that control the direction and rate of the flow of thermal energy. Some embodiments can be mass produced in a factory and lend themselves to normal intermodal transportation and handling. In some embodiments, the outside surface temperature of the thermal storage unit may not exceed 60° C., regardless of the core temperature.

In some embodiments, the heat extracted from a recycle stream of a thermal storage medium by heat pipes may be transferred to a separate loop of helium, argon, or other inert gases that are pressurized up to 80 bars, for example. The recycle line may include pipes made from ceramic-lined stainless steel. In some embodiments, the pipes may be lined with a castable $Al_2O_3$-based refractory and insulated with $Al_2O_3$ fiber or a combination of low density and high density SiC. In some embodiments, the recycle line pipe may have a diameter of 15-30 mm.

Preferably, when the device is using a gaseous mixture for thermal transfer, the thermal storage unit utilizes at least one internal circulation impeller having ceramic magnets that is located within the interior cavity, and a motor outside the cavity with magnetic rotors, arranged to drive the internal impeller. However, any suitable motor, rotor, and/or impeller system may be used. The circulation system may be permanently powered by electric motors, backed up with rechargeable integrated batteries, or driven by thermal couples that take advantage of the temperature difference of the thermal storage unit and the outside air temperature.

Another circulation mechanism that may be employed in certain embodiments is a Stirling engine integrated either directly off of the primary recycle line or from the thermal storage unit. In an embodiment, gas from the thermal storage unit in excess of 2000° C. may be used. The discharged gas can subsequently be piped to a load such as a gas turbine or steam plant. In another embodiment, the Stirling engine is used after the load.

In one embodiment, a two-cylinder Stirling engine is used. On the first cycle, energy in the form of heat and pressure pushes a first cylinder up, and forces an inert gas, such as helium that has cooled from the work it did in the previous cycle, back to the energy source. In some embodiments, the energy may come from the sun, for example. A second cylinder from the second cycle is cooling, and after the second cylinder has exhausted the cooled gas, will a cam will flip a circuit and hot gas under pressure will force the cooled inert gas out to the energy source, Since the action is reciprocal, the inert gas is continuously circulated.

As the energy comes from the energy source and into a heat exchanger at a turbine, heated compressed air drives the turbine and the majority of the energy is extracted from the inert gas. The gas temperature at the heat exchanger may be about 1400° C. at 45 bar in some embodiments. The exhaust gas may be approximately 950° C. at 20 bar and may be delivered to the Stirling engine to do mechanical work, both circulating gas and generating electricity to offset the parasitic load of the energy source.

An ultra-high temperature gasifier may be used where sufficient energy has been removed to lower the gas temperature from above 2500° C. to under 1000° C., and the gas may then be passed to a secondary load to produce electricity. In yet another embodiment, a high temperature turbocharger can be used after the load has reduced the temperature down to a point where the turbocharger can safely operate. A simple blower may be used in embodiments where a load uses enough energy to reduce the gas temperature to ~100° C., as in some applications for producing negative thermal energy in adsorption or absorption chillers, or low temperature applications using the Rankin Cycle, Katina Cycle, or those that provide low temperature steam to electric systems.

FIG. 1 illustrates a basic conceptual diagram of a thermal storage unit 100, according to an embodiment of the present invention. Thermal storage unit 100 includes a core 110 containing a thermal storage medium. Thermal energy is delivered to core 110 by means of pipe 120, which contains a thermal transfer medium. In some embodiments, pipe 120 may both deliver thermal energy to, and extract thermal energy from, thermal storage unit 100. In other embodiments, a separate pipe may be used for extracting the thermal energy from thermal storage unit 100. While pipes are discussed here, any other suitable vehicle for transferring thermal energy may be used. The number of pipes used, and whether a pipe is used for a single or dual purpose, is a matter of design choice. In some embodiments, core 110 is completely constructed from solid materials (some of which may turn to liquid at higher temperatures). In other embodiments, core 110 contains a combination of solid materials and gas—preferably an inert gas.

Core 110 is surrounded by an inner layer 130 that has significant refractory properties to help trap thermal energy within core 110. In some embodiments, multiple intermediate layers may be used. However, each successive layer is generally less dense than the layer to its interior, and the layers generally have more insulative, and less refractory, properties the closer the layer is to the outside of thermal storage unit 100. Inner layer 130 may be surrounded by an intermediate layer 140 that has less refractive properties and more insulative properties than inner layer 130. Intermediate layer 140 may also be less dense than inner layer 130.

Intermediate layer 140 is surrounded by outer layer 150 that has significant insulative properties. Surrounding outer layer 150 is a casing 160. In some embodiments, casing 160 may be pressure rated and may be crafted from a strong material such as pressure rated steel. Typically, the layers of thermal storage unit 100 are designed such that heat very slowly passes from the inner layers to the outer layers in a state of quasi-static equilibrium while storing thermal energy. Through such an architecture, core 110 may be extremely hot, while casing 160 remains relatively cool. For example, casing 160 may be 60° C. or less in some embodiments.

Figure 2:
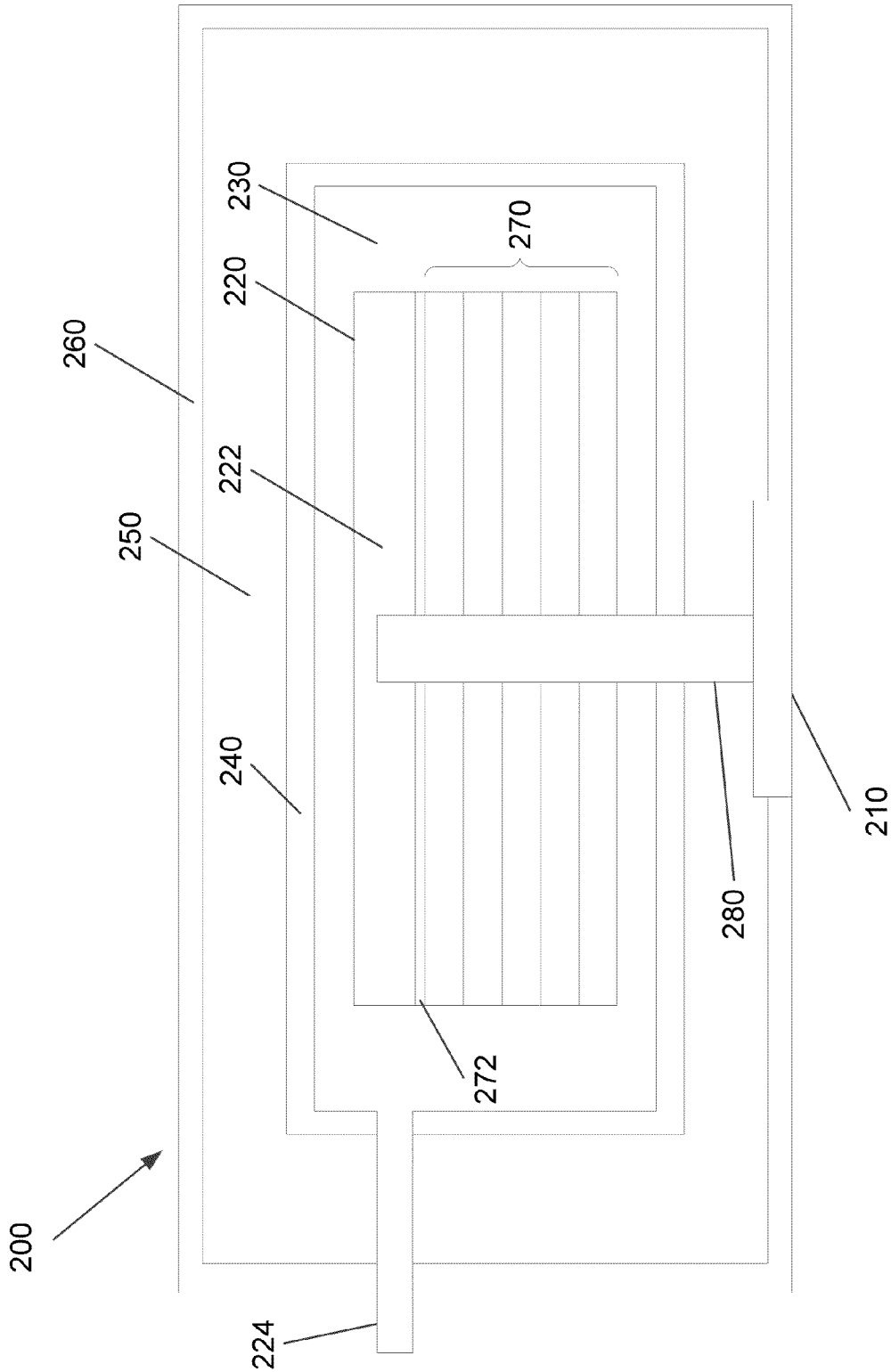
FIG. 2 illustrates a side view of a thermal storage unit, according to an embodiment of the present invention.

FIG. 2 illustrates a side view of a thermal storage unit 200, according to an embodiment of the present invention. In some embodiments, thermal storage unit 200 may be part of the slag processing and thermal recovery system described in parent U.S. patent application Ser. No. 13/326,454. However, thermal storage unit 200 may be used with any suitable system, and for any desired purpose. Thermal storage unit 200 includes a proximity heat exchanger 210 that receives and transfers heat from any suitable external thermal energy source and delivers heat to the system via ceramic pipe 280. While shown as recessed within the unit in this embodiment, in many embodiments, proximity heat exchanger 210 may be positioned externally to thermal storage unit 200 and ceramic pipe 280 may extend out of thermal storage unit 200. Possible sources of thermal energy include, but are not limited to, heat collected and transferred from an industrial process via a thermal transfer medium such as PocoFoam®, heat from the sun (via collection of photon energy such as from the visible light spectrum, infrared spectrum, or any other spectrum from which photon energy is captured), a plasma torch (converting electrical energy into thermal energy), a heat exchanger in an exhaust flue of a gasifier or furnace, etc. A person of ordinary skill in the art will understand that any suitable heat source will suffice for supplying thermal storage unit 200.

Thermal storage unit 200 has an interior cavity 220 defined by an inner layer 230 including a ceramic material. Inner layer 230 may include, for example, $Al_2O_3$, SiC, silicon tungstate, any mixtures or layers thereof, or any other suitable material or combination. In some embodiments, the $Al_2O_3$ may be pure corundum. Inner layer 230 is surrounded by an intermediate ceramic layer 240 having a lower density than the inner layer. The intermediate layer may include $Al_2O_3$ (including corundum), SiC, silicon tungstate, zirconium-based ceramics, or mixtures or layers thereof. A suitable corundum material for some embodiments is available under the trademark KORRATH®. An outer ceramic layer 250 of still lower density than intermediate ceramic layer 240 surrounds intermediate ceramic layer 240. The material of outer layer 250 may be low density $Al_2O_3$ ceramics, low density SiC ceramics, silicon tungstate ceramics, zirconium-based ceramics, aluminum silicate ceramics, or mixtures or layers thereof. In an embodiment, the material of the outer ceramic layer includes aluminum silicate fiber.

While only a single intermediate layer is shown here, multiple intermediate layers are possible in other embodiments, and the layers may be similar or different grades of the same material, for example. Generally, the layers should have a decreasing density moving from the innermost layer to the outermost layer in order to more effectively facilitate thermal equilibrium. Outer ceramic layer 250 is surrounded by a pressure-rated shell 260 that is gas tight and may be made of a metal such as stainless steel, for example. However, any suitable material may be used that keeps the internal material in an inert environment at operating temperatures.

In some embodiments, a layer of thermal insulation, such as various refractory concretes or geopolymer concretes, may encase the outer shell (not shown). This layer may further be surrounded by an insulation blanket. Suitable materials for the insulation blanket in some embodiments include silica aero gels such as those available under the trademark Pyrogel®. For certain environments, the entire container can be further covered with Kevlar® or glass fiber. Thermal storage unit 200 may be configured to fit inside a standard 20 foot ocean freight container or a specially made rail car, though some reinforcement may be necessary to accommodate the weight in some embodiments.

Some embodiments use a combination of different ceramics for at least some of the layers that are composed of various mixtures of materials such as $ZrO_2$, $Al_2O_3$, $SiO_2$, and SiC. These materials may be fashioned into tiles having a desired thickness for the given implementation, such as 5 cm for certain embodiments. Different combinations of materials may be used in the core of thermal storage unit 200, other materials may be used to contain the core, and still other materials may be used to control the thermal transfer. The ratio between various ceramics and metals or alloys, or combinations of these materials, may vary in order to increase or decrease thermal density and/or to create different charging and discharging characteristics. The precise values will vary depending on the ceramic(s) and metal(s) and/or alloy(s) that are chosen and also depending on the temperature of operation of thermal storage unit 200.

The layers of thermal storage unit 200 may be configured differently to facilitate different applications. For instance, in some embodiments where lower cost, long storage time, and erratic discharge characteristics are desired for off-grid community-based applications, trays 270 may have reservoirs, or troughs, that are designed to contain a material with a high specific heat capacity that undergoes a solid-to-liquid phase change (and vice versa), such as certain metals and alloys. Most metals have lower melting temperatures than most ceramics. As such, the reservoirs may be made from a ceramic material and filled or coated with a metal. Metals such as nickel have a high specific heat capacity such that they store proportionally large amounts of energy. The reservoirs contain the molten metal after a phase change to a liquid state and allow the metal to return to its solid state in generally the same shape as prior to the phase change.

In many embodiments, thermal storage unit 200 is solid state in that few or no mechanical or moving internal components are present. In order to transport the thermal energy into and out of thermal storage unit 200, graphite foam composites with high thermal conductivity may be used. Many solid state graphite foam composites may be used, and using a combination of graphite foam with a nanolayer of BN may be beneficial. The theoretical thermal conductivity of hexagonal boron nitride nanoribbons (BNNRs) can approach 1700-2000 W/(m·K). This is the same order of magnitude as the experimental measured value for graphene, another substance that can be combined with graphite to create a super thermal conductive solid state medium. This graphite foam composite may be used as a solid state thermal transfer medium and may be distributed in thin layers between the layers of ceramics or distributed between layers of high density graphite.

The ceramic tiles of the core and the subsequent layers may be fashioned to interlink in order to provide integrity and promote better control of thermal distribution. In some embodiments, thermal storage unit 200 may store 250 kwh of thermal energy per meter cubed at 1550° C. When operating at temperatures above 1550° C., in some embodiments, graphite foil may be used to line the reservoirs of trays 270. This is because the metal or other melting material may react with the ceramic from which the reservoir is made when in direct contact at less than 100 degrees hotter than 1550° C. At temperatures higher than 1700° C., for example, graphite foil may be used as containment for the ceramics when they are in their molten state.

Thus, thermal energy can be transferred to a thermal storage medium that will accommodate the energy in one or more storage modes, depending on the architecture. One mode may be storage by means of a rise in temperature alone. In this mode, none of the materials in the thermal storage medium undergo a phase change. Another mode may be where a metal portion of the thermal storage medium undergoes a phase change and the ceramic portion does not. Yet another mode may be where both the metal and ceramic portions of the thermal storage medium undergo phase changes.

However, the maximum temperature at which $Al_2O_3$/SiC ceramics can be used for extended periods of time with nickel and other metals is typically approximately 2650° C. Above this temperature, $O_2$ generally sublimates from the core material and the combination of core materials increases the percentage of the metallic fraction significantly. Above 2650° C., SiC and other carbides may be used and graphite foil may be molded to provide boats that prevent metals such as nickel from reacting with the carbides.

In FIG. 2, the layers are shown as separate for simplicity and ease of viewing. However, in many embodiments, the layers include molded interlocking bricks that are manufactured to form a resisting interface. In some embodiments, such as that depicted in FIG. 2, gas may be contained within interior cavity 220. Each layer is progressively less dense and inner layer 230 may also have refractory properties to help store the thermal energy. Intermediate ceramic layer 240 and outer ceramic layer 250 may have less refractory properties and act more as insulation than inner layer 230. This enables thermal energy to be retained within thermal storage unit 200 without having too high of a temperature on the outside for human safety, and further avoids substantial heat loss through convection.

Interior cavity 220 can be packed with trays 270 including a thermal storage medium such as a metal or alloy. Trays 270 may be close-packed in some embodiments. Further, in some embodiments, trays 270 may be packed horizontally, or arranged in any other suitable configuration as would be understood by a person of ordinary skill in the art. Trays 270 are not necessarily illustrated to size in FIG. 2 and the precise number of trays will vary depending on the dimensions both of trays 270 and interior cavity 220. The number and dimensions of trays 270 and the dimensions of interior cavity 220 are a matter of design choice. Trays 270 are packed to fill the space in interior cavity 220 in this embodiment.

Thermal storage unit 200 is provided with thermal energy by proximity heat exchanger 210 and a ceramic pipe 280. Ceramic pipe 280 extends through pressure-rated shell 260 and layers 230, 240, and 250, into interior cavity 220. While in this embodiment, ceramic pipe 280 enters thermal storage unit 200 from underneath, in other embodiments, ceramic pipe 280, or any other suitable thermal transfer structure or mechanism, may enter thermal storage unit 200 from any side as a matter of design choice. Further, in other embodiments, multiple pipes or thermal transfer mechanisms may be used for delivering thermal energy to thermal storage unit 200, extracting thermal energy from thermal storage unit 200, or any combination thereof. Ceramic pipe 280 is secured by suitable means within layers 230, 240, and 250 such that thermal storage unit 200 is gas-tight. For instance, ceramic pipe 280 may be welded to pressure-rated shell 260. At the top of interior cavity 220 is a drop-out chamber. Area 222 is separated from trays 270 by means of a cover 272. Cover 272 may be made from a ceramic material filled with small capillaries in the range of 1-2 nm in some embodiments. Such capillaries allow the passage of gases, but not of any other materials. As such, cover 272 acts as a filter for the rest of interior cavity 220.

Ceramic pipe 280 may be constructed from SiC, for example, and may be filled with SiC microspheres and nanospheres that are coated with BN. BN microspheres may have a diameter in the range of 3-12 μm and the SiC microspheres may have a diameter in the range of 5-30 μm, for example. The larger microspheres are generally in close proximity with the walls of ceramic pipe 280 and therefore allow thermal energy to be transferred via conduction. The nanospheres are allowed to circulate between the much larger microspheres in ceramic pipe 280. These nanospheres may circulate essentially as a liquid under these conditions and the nanospheres equalize the temperature from drop out chamber 222 at the top of interior cavity 220 to the input entry port of the core. The BN particles are generally smaller than the SiC nanospheres. BN has superior thermal conductivity and exhibits super lubricity. Additionally, BN is generally stable in inert gases at temperatures up to 2800° C. The energy is transferred via convection, radiation, and direct thermal conduction between the gas, SiC and BN and the colder thermal core (e.g., interior cavity 220). This material within ceramic pipe 280 has sufficient surface area to harvest a large portion of the energy from the passing helium, argon, or other inert gases, as well as the BN. This material also captures energy from the helium, argon or other inert gases percolating down through interior cavity 220 from drop-out chamber 222.

The BN coats the SiC spheres, allowing the spheres to circulate without the normal abrasion that may be expected with SiC particles. The BN also helps to increase the thermal conductivity of the silicon carbide tubes, as well as the SiC spheres of both sizes. The finer particulates of BN tend to create a suspension-like state in the gaseous helium, argon, or other inert gas that increases the amalgam's density. This increased density enhances the overall mass density and thus increases the amount of energy that the helium, argon, or other inert gas can collect on the hot side of thermal storage unit 200.

In some embodiments, BN and the SiC spheres may be present throughout ceramic pipe 280 and up into drop-out chamber 222. The cool side after the exit point from the core may also be populated with BN for the same purpose. In a configuration where a phase change does not occur in the thermal storage medium of trays 270, low pressure helium, argon, or other inert gases may be used alone to reduce production cost. The additional mass of the BN and SiC help compensate for the significantly lower thermal conductivity of the helium, argon, or other inert gases. This allows thermal storage unit 200 to function within desired design parameters at lower pressures.

Ceramic pipe 280 opens into interior cavity 220 and may be gas-tight so that little or no gas escapes through any surface of interior cavity 220. Ceramic pipe 280 may be a good thermal conductor and as such, heat may radiate out from the gas within ceramic pipe 280 into interior cavity 220, and thus to the thermal storage medium included in trays 270. In some embodiments, gas may be used as a thermal transfer medium in ceramic pipe 280. In such embodiments, a pipe 224 is included having a circulating pump (not shown) on the cooler side. After the gas has been transported through proximity heat exchanger 210, the gas passes through ceramic pipe 280, into drop-out chamber 222, passes through cover 272 and through trays 270, enters pipe 224, and then is pumped back into ceramic pipe 280 via a connection that is not shown here.

However, in some potentially preferable embodiments, thermal conductive PocoFoam® or another graphite transfer medium is used to transfer the energy, as this eliminates the need to use gas that is generally under relatively high pressure (e.g., 20-40 bars). Also, where gas is used, the unit should generally be a narrower cylinder than in solid state graphite composite embodiments to facilitate the movement of the gas from top to bottom. Using gas, BN-coated SiC microspheres should generally be used to enhance the thermal density of the gas. When using the gas under pressure, the flow thereof is used to control the amount of energy that is charged or discharged. If using the solid state graphite foam, the volume with respect to the amount of pipe going into and out of thermal storage unit 200 yields a combined volume that allows calculation of the total surface area for energy transfer.

In some embodiments, the overall external diameter of thermal storage unit 200 may be approximately 2.4 m. However, the precise size and shape of thermal storage unit 200 is a matter of design choice. The internal layers may have different thicknesses depending on the temperature differential to be controlled and the materials that are chosen. In some embodiments, the ranges may include, but are not limited to, an outer diameter of interior cavity 220 of 1.0-1.2 m, an outer diameter of inner layer 230 of 1.2-1.5 m, an outer diameter of intermediate layer 240 of 1.5-1.8 m, and an outer diameter of outer ceramic layer 250 of 1.8-2.3 m. In some embodiments, pressure-rated shell 260 may have a thickness of 5-15 cm. The height of thermal storage unit 200 may be 2.4-6.0 m in some embodiments, depending on the application and the requisite storage capacity.

Figure 3:
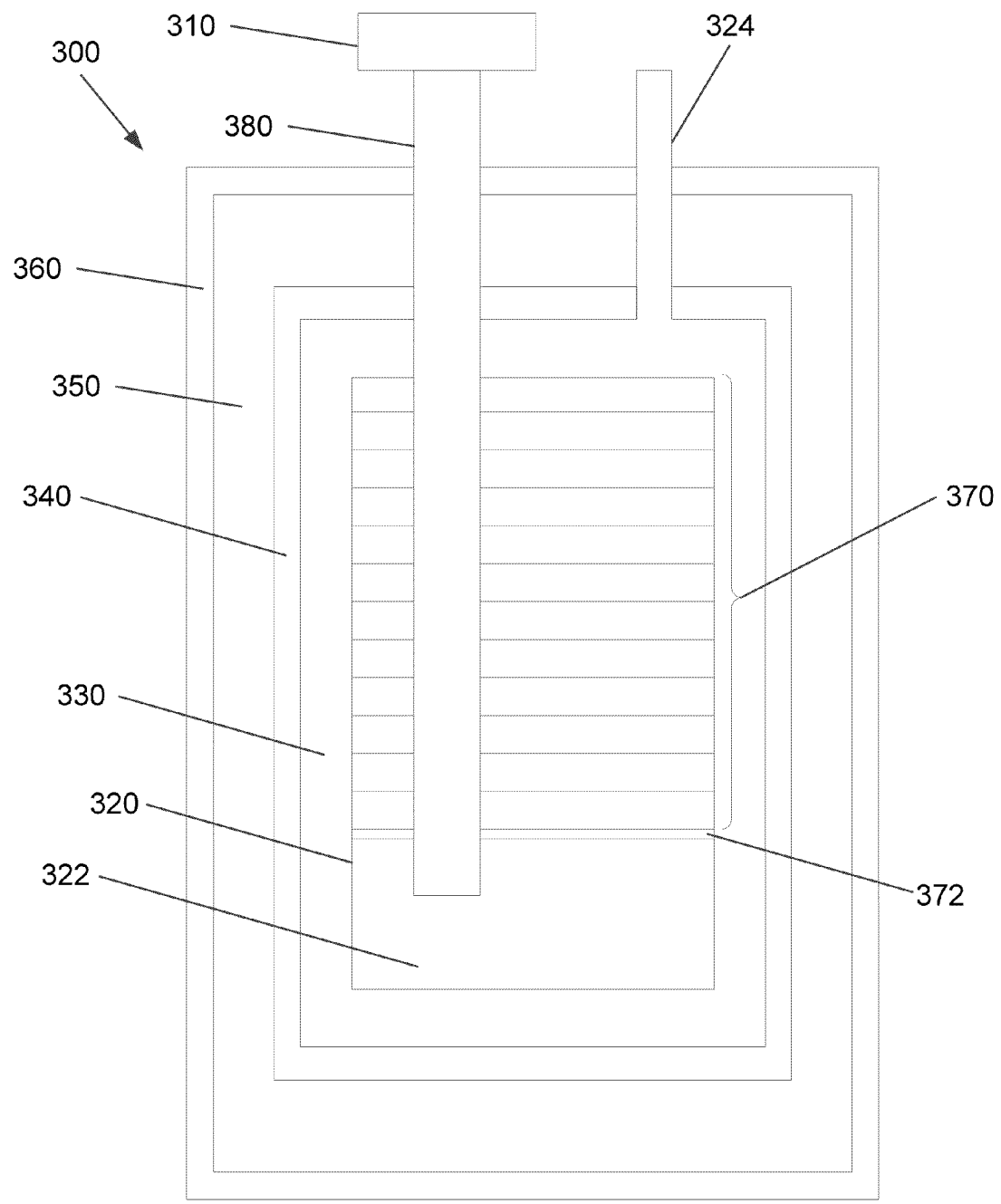
FIG. 3 illustrates a side view of a thermal storage unit, according to an embodiment of the present invention.

FIG. 3 illustrates a side view of another thermal storage unit 300, according to an embodiment of the present invention. Thermal storage unit 300 is operably connected to a thermal energy source 210 that provides thermal energy to the system via ceramic pipe 380.

Thermal storage unit 300 has an interior cavity 320 defined by an inner layer 330 including a ceramic material. Inner layer 330 is surrounded by an intermediate ceramic layer 340 of lower density than the inner layer, and an outer ceramic layer 350 of still lower density than intermediate ceramic layer 340. While only a single intermediate layer is shown here, multiple intermediate layers are possible in some embodiments. Generally, the layers should have a decreasing density moving from the innermost layer to the outermost layer in order to more effectively facilitate thermal equilibrium. Outer ceramic layer 350 is surrounded by a pressure-rated shell 360 which is gas tight and may be made of a metal such as stainless steel, for example.

As with FIG. 2, in FIG. 3, the layers are shown as separate for simplicity and ease of viewing. However, in many embodiments, the layers include molded interlocking bricks that are manufactured to form a resisting interface to contain gas within interior cavity 320. Each layer is progressively less dense and inner layer 330 may also have refractory properties to help store the thermal energy. Intermediate ceramic layer 340 and outer ceramic layer 350 may have less refractory properties and act more as insulation. This enables thermal energy to be retained within thermal storage unit 300 without having too high of a temperature on the outside for human safety, and further avoids substantial heat loss through convection.

Interior cavity 320 is packed with trays 370 including a thermal storage medium. Trays 370 may be close-packed in some embodiments. Trays 370 are not necessarily illustrated to size in FIG. 3 and the precise number of trays will vary depending on the dimensions both of trays 370 and interior cavity 320. The number and dimensions of trays 370 and the dimensions of interior cavity 320 are a matter of design choice. Trays 370 are packed to fill the space in interior cavity 320 in this embodiment.

Thermal storage unit 300 is provided with thermal energy by a thermal energy source 310 and ceramic pipe 380. Ceramic pipe 380 extends through pressure-rated shell 360 and layers 330, 340, and 350, into interior cavity 320. Ceramic pipe 380 is secured by suitable means within layers 330, 340, and 350 such that thermal storage unit 300 is gas-tight. For instance, ceramic pipe 380 may be welded to pressure-rated shell 360. At the bottom of interior cavity 320 is a drop-out chamber. Area 322 is separated from trays 370 by means of a cover 372. Cover 372 may be made from a ceramic material filled with small capillaries in the range of 1-2 nm in some embodiments. Such capillaries allow the passage of gases, but not of any other materials. As such, cover 372 acts as a filter for the rest of interior cavity 320.

Ceramic pipe 380 opens into interior cavity 320 and may be gas-tight so that little or no gas escapes through any surface of interior cavity 320. Ceramic pipe 380 may be a good thermal conductor and, as such, heat may radiate out from the gas within ceramic pipe 380 into interior cavity 320, and thus to the thermal storage medium included in trays 370. In some embodiments, such as that shown in FIG. 3, gas may be used as a thermal transfer medium in ceramic pipe 380. In such embodiments, a pipe 324 is included having a circulating pump (not shown) on the cooler side. After the gas has been transported through thermal energy source 310, the gas passes through ceramic pipe 380, into drop-out chamber 322, passes through cover 372 and through trays 370, enters pipe 324, and then is pumped back into ceramic pipe 380 via a connection that is not shown here.

However, in some embodiments, thermal conductive Poco-Foam® or another graphite transfer medium is used in layers between the core tiles to transfer the energy, as this eliminates the need to use gas that is generally under relatively high pressure (e.g., 20-40 bars). Also, where gas is used, such as in FIG. 3, the unit should generally be a narrower cylinder than in solid state graphite composite embodiments to facilitate the movement of the gas from bottom to top with input coming in at the top and as the gas percolates upward from the bottom, the gas is extracted from the top. Using gas, BN-coated SiC microspheres should generally be used to enhance the thermal density of the gas. When using the gas under pressure, the flow thereof is used to control the amount of energy that is charged or discharged. If using the solid state graphite foam, the volume with respect to the amount of pipe going into and out of thermal storage unit 300 yields a combined volume that allows calculation of the total surface area for energy transfer.

Figure 4:
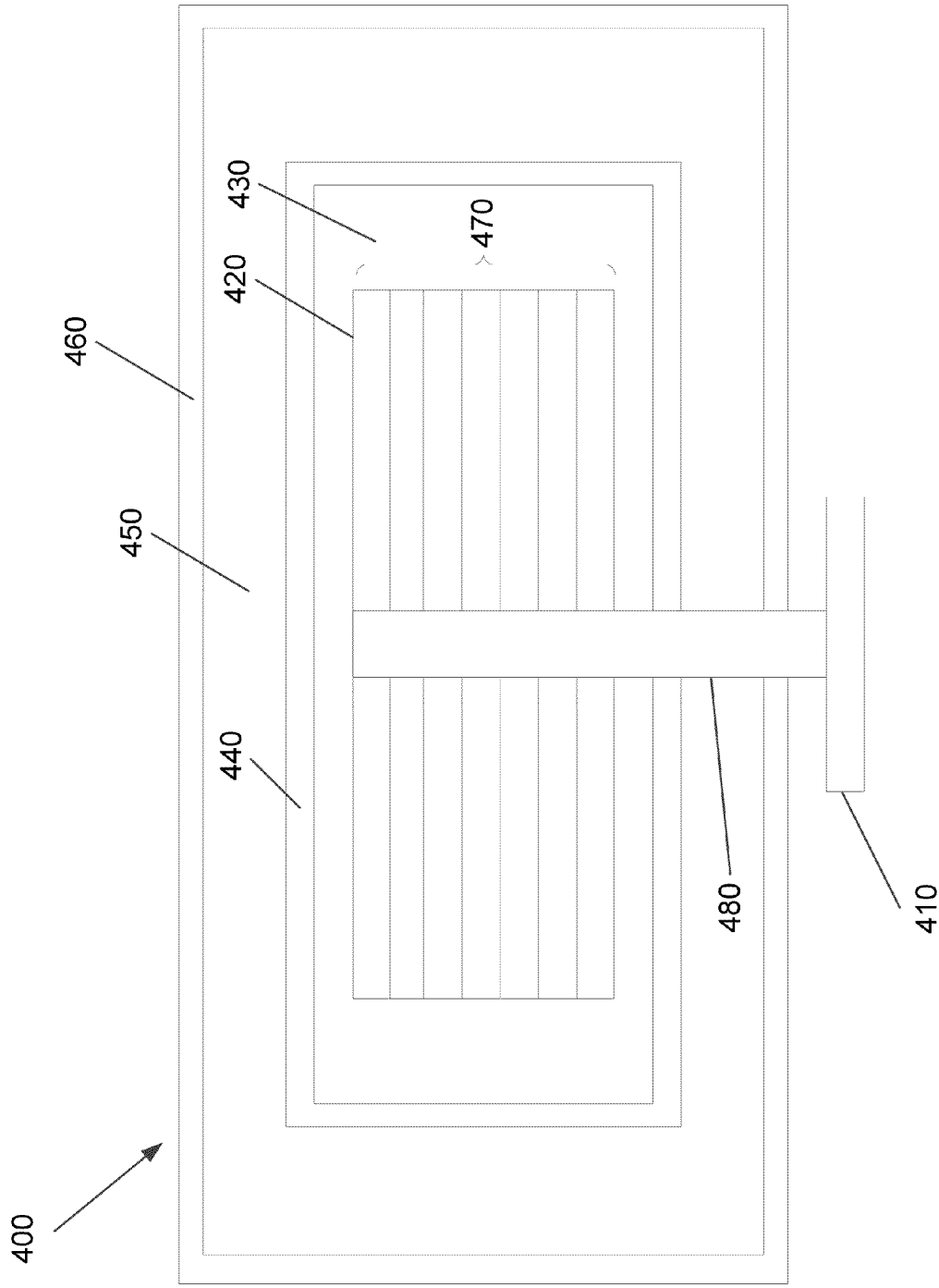
FIG. 4 illustrates a solid state thermal storage unit, according to an embodiment of the present invention.

FIG. 4 illustrates a solid state thermal storage unit 400, according to an embodiment of the present invention. Similar to thermal storage unit 300 of FIG. 3, thermal storage unit 400 is also provided with thermal energy by a thermal energy source 410 and ceramic pipe 480. In this embodiment, no drop-out chamber is present since the solid state thermal storage unit 400 does not use gas to facilitate the transfer of thermal energy. Rather, energy is transferred directly to a thermal storage medium within trays 470 contained within core 420. Each of trays 470 may include a plurality of interlocking thermal storage cells (not shown), may be crafted as a single structure, or may take any suitable architecture as desired by the system designer.

Similar to FIGS. 1-3, core 420 is surrounded by an inner layer 430 that has significant refractory properties to help trap thermal energy within core 420. Inner layer 430 is surrounded by an intermediate layer 440 that has less refractive properties and more insulative properties than inner layer 430. Intermediate layer 440 is also less dense than inner layer 430. Intermediate layer 440 is surrounded by an outer layer 450 that has significant insulative properties. Surrounding outer layer 450 may be a casing 460 in some embodiments. In some embodiments, casing 460 may be pressure rated and may be crafted from a strong material such as pressure rated steel.

FIG. 5A illustrates a perspective view of a bottom side of a thermal storage cell 500, or tile, according to an embodiment of the present invention. In some embodiments, thermal storage cell 500 may be included in any of the trays of FIGS. 2-4. Thermal storage cell 500 is generally constructed primarily from a strong material that is resistant to compression and tolerant to high levels of heat, such as white corundum.

In this embodiment, thermal storage cell 500 has a hexagonal shape. However, the precise shape and, if applicable, the number of sides, are a matter of design choice. For instance, any given side of a thermal storage cell may be straight, curved, or a combination thereof. Further, various cells may have different shapes as a matter of design choice. In some embodiments, a single cell may function as an entire tray. In any given cell, a single thermal storage medium section or multiple thermal storage medium sections may be included.

A thermal storage medium 510 is located in the center of thermal storage cell 500. Thermal storage medium 510 may be, for example, Ni for high capacity storage applications that are below the boiling point of Ni, Ni slugs in holes drilled in thermal storage cell 500 (not shown) for lower capacity applications, or any other suitable thermal storage medium selected for the application that is desired. Per the above, the higher the temperature achieved in the core, the more thermal energy that can be stored.

Thermal storage medium 510 is contained within a reservoir 520, and a first recess 530 surrounds reservoir 520 and thermal storage medium 510. In some embodiments, reservoir 520 may have a depth of approximately 20 mm. In this embodiment, reservoir 520 is deeper than first recess 530. However, in some embodiments, first recess 520 may not be present, as the depth of this section of thermal storage cell 500 may be even with a lower lip 540. In such embodiments, a groove (not shown) may be present between lower lip 540 and the body of thermal storage cell 500 such that a locking and spacing tool can be attached. Generally, thermal storage cells 500 have exceptional compression strength even at high temperatures.

While not shown here for the purpose of illustrating the underlying structure, reservoir 520 would be filled with a thermal transfer medium such as PocoFoam® in many embodiments. Typically, the thermal transfer medium also covers and fills first recess 530. However, in some embodiments, the thermal transfer medium only fills reservoir 520 and extends out therefrom. In such embodiments, first connector pipe 550 typically extends into the thermal transfer medium.

Lower lip 540 is located on the outside of thermal storage cell 500 in this embodiment. Lower lip 540 may facilitate interlocking between horizontally adjacent thermal storage cells and spacing between vertically adjacent cells via a locking and spacing tool, such as the locking and spacing tool illustrated in FIGS. 6A-6C. However, in other embodiments, locking and/or spacing may be provided on the top of the thermal storage cells in addition to, or in lieu of, the locking and spacing provided on the bottom. Such locking and spacing may keep the thermal storage cells tightly packed together while mitigating damage to the thermal transfer media by adjacent thermal storage cells.

Reservoir 520 ensures that a substantial portion or the entire mass of thermal storage medium 510 is in contact with the thermal transfer medium. A first connector pipe 550 connects to a network of pipes (not shown) for the thermal energy delivery system that transfers thermal energy received from an energy source into the thermal storage unit. First connector pipe 550 passes into the thermal transfer medium and delivers energy thereto. In turn, the thermal transfer medium delivers energy to thermal storage medium 510, which may transition to a liquid state with sufficient energy input in some embodiments. A cavity (not shown) is molded into the walls of the thermal storage cells to accommodate the network of pipes in this embodiment.

Where an operating temperature of up to 1200° C. is desired, thermal storage cell 500 may be constructed from glass or glass with copper, for example. The glass may include $Si_2O_3$ derived from recycled glass, which generally has a melting temperature of between 1600 and 1700° C. This glass material may have a boiling temperature of over 2200° C. In this example, copper or copper alloy (having a melting temperature of between 800 and 1000° C.) may be used in thermal storage medium 510, which may exhibit phase transformation. At temperatures of operation of between 1250° C. and 1700° C., thermal storage cell 500 may be constructed from a ceramic material such as SiC and SiC ceramic composites, for example, and may include a metal such as nickel or nickel alloy in thermal storage medium 510. At these temperatures of operation, thermal storage medium 510 will have a phase change in the nickel or nickel alloy, but there will generally not be a phase change in the ceramics of thermal storage cell 500.

At temperatures of operation of up to 2800° C., thermal storage cell 500 may be constructed from molded carbon or graphite as both the nickel and SiC or SiC ceramic composite will generally exhibit a phase change. Thermal storage cell 500 should retain its form even at high temperatures such that thermal storage medium 510 is retained therein until such a time as the energy needs to be discharged and both the metal and the ceramics exhibit a phase change in the opposite direction—namely, back to a solid state. Depending on the desired temperature of operation, any cell construction material and thermal storage medium may be selected such that thermal storage cell 500 remains in a solid state while thermal storage medium 510 undergoes a phase change.

Figure 5B:
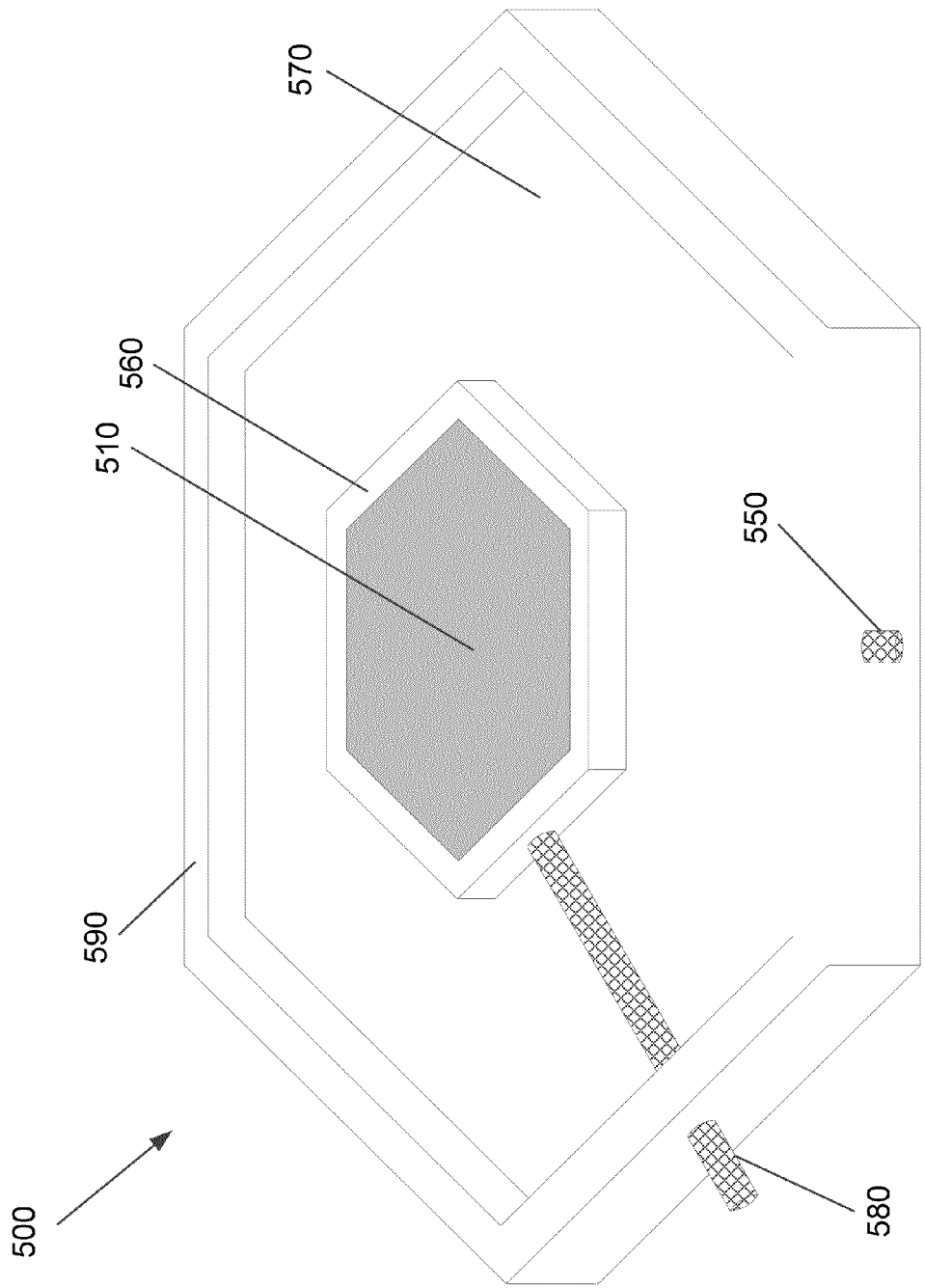
FIG. 5B illustrates a perspective view of a top side of the thermal storage cell, according to an embodiment of the present invention.

FIG. 5B illustrates a perspective view of a top side of thermal storage cell 500, according to an embodiment of the present invention. A reservoir 560 contains thermal storage medium 510 and separates thermal storage medium 510 from thermal storage cells below thermal storage cell 500. A second recess 570 may be constructed from the same material as the rest of thermal storage cell 500, such as white corundum. In some embodiments, second recess 570 is approximately 10 mm deep, and may be shallower than first recess 530.

In some embodiments, reservoir 560 is constructed such that when thermal storage medium 510 is fully expanded, thermal storage medium 510 occupies approximately 90-95% of the volume of reservoir 560. A locking and spacing tool, such as that of FIGS. 6A-C, may provide additional clearance between layers of thermal storage cells. In some embodiments, this clearance may be an additional 7-8 mm. Between the remaining unoccupied volume of the reservoir and the space provided by the locking and spacing tool, thermal storage medium 510 in reservoir 560 is generally prevented from contacting thermal storage cells above.

Thermal transfer media such as graphite foam are generally mechanically soft compared to the materials from which the remainder of thermal storage cell 500 is constructed. As such, the thermal storage media should generally be protected from the weight of the thermal storage cells above the space in which it resides. Accordingly, the body of thermal storage cell 500 is typically constructed from a mechanically strong material such as white corundum that can carry the weight of layers above. In some embodiments, it may be beneficial to include a framework of white corundum to support the weight of the layers in order to avoid compressing the graphite foam, particularly in some vertically-oriented storage configurations.

Second recess 570 surrounds reservoir 560. Second recess 570 is generally filled with a thermal transfer medium, such as PocoFoam®. A consideration that should generally be taken into account is the mass of the thermal transfer medium. Typically, it is desirable for the mass of the thermal transfer medium to be equal to the mass of the thermal storage medium from which energy is to be extracted. Second recess 570 may be deeper, the same depth, or shallower than first recess 530, as desired. In this embodiment, second recess 570 is shallower than first recess 530.

A second connector pipe 580 passes from reservoir 560 through an upper lip 590. Second connector pipe 580 is surrounded by the thermal transfer medium in this embodiment. Second connector pipe 580 interconnects with a network of tubes and pipes (not shown) that extract energy from the system. In other words, in the embodiment illustrated in FIGS. 5A and 5B, separate pipe networks are used for thermal delivery and thermal extraction. As can be seen, first connector pipe 550 is also visible from this view in this embodiment.

Figure 6A:
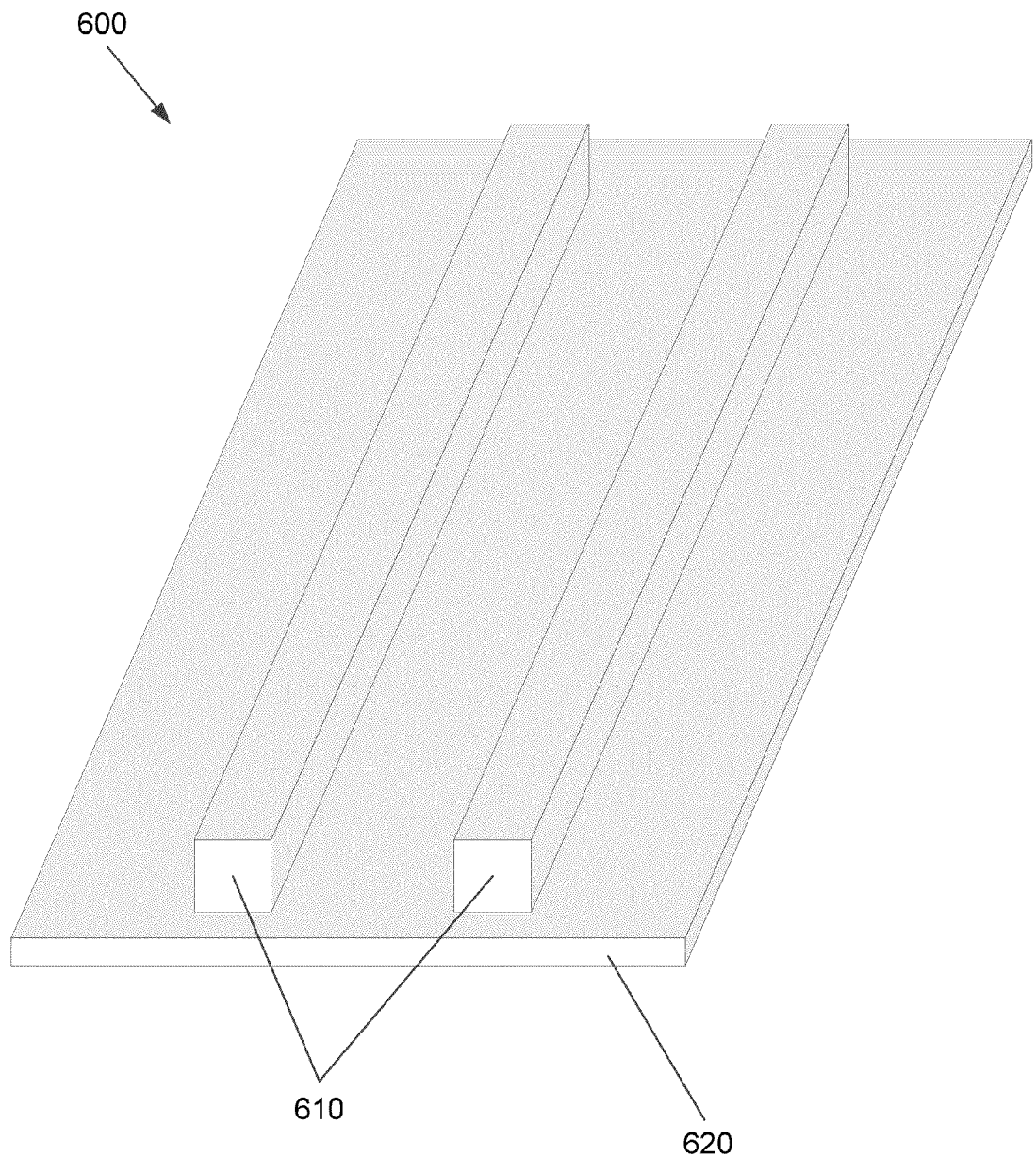
FIG. 6A illustrates a perspective view of a locking and spacing tool, according to an embodiment of the present invention.

FIG. 6A illustrates a perspective view of a locking and spacing tool 600, according to an embodiment of the present invention. Locking and spacing tool 600 has two rails 610 that lock lips of two thermal storage cells together. More specifically, the lips are positioned together and placed between rails 610, forming a tight fit. In a hexagonal design such as that of FIGS. 5A and 5B, six locking and spacing tools 600 may be used to lock together six horizontally adjacent cells.

Locking and spacing tool 600 also has a spacer 620 upon which rails 610 are positioned. Spacer 620 protects the thermal transfer media in the cells from mechanical damage and separates the energy extraction layer, the top of each layer of cells, and the energy delivery layer on the bottom of each layer of cells. The space provides insulation and mechanical support, as well as helps to facilitate easier assembly. The dimensions and spacing of rails 610 and spacer 620 are a matter of design choice. Also, the type of locking and/or spacing mechanism that is used in any given implementation is a matter of design choice.

Figure 6B:
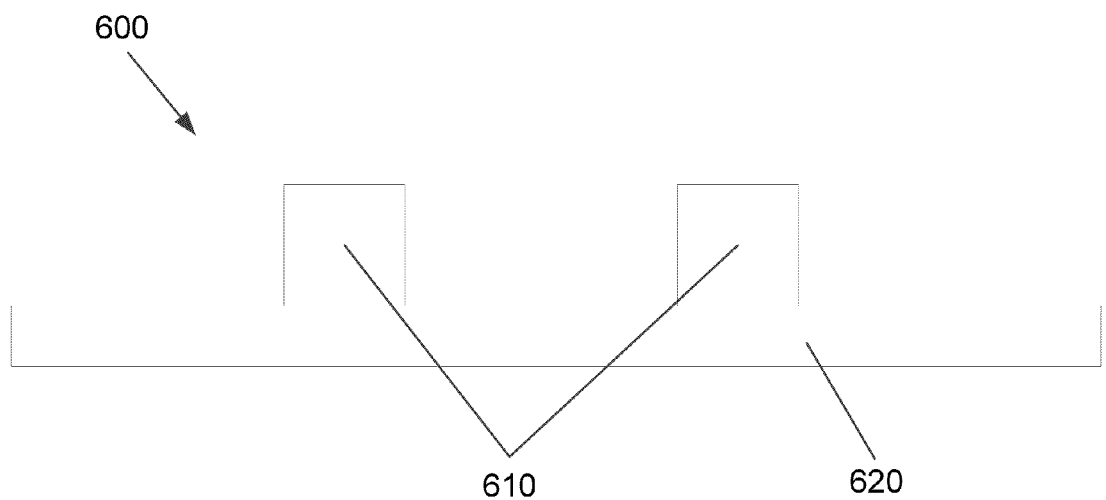
FIG. 6B illustrates a side view of the locking and spacing tool, according to an embodiment of the present invention.
Figure 6C:
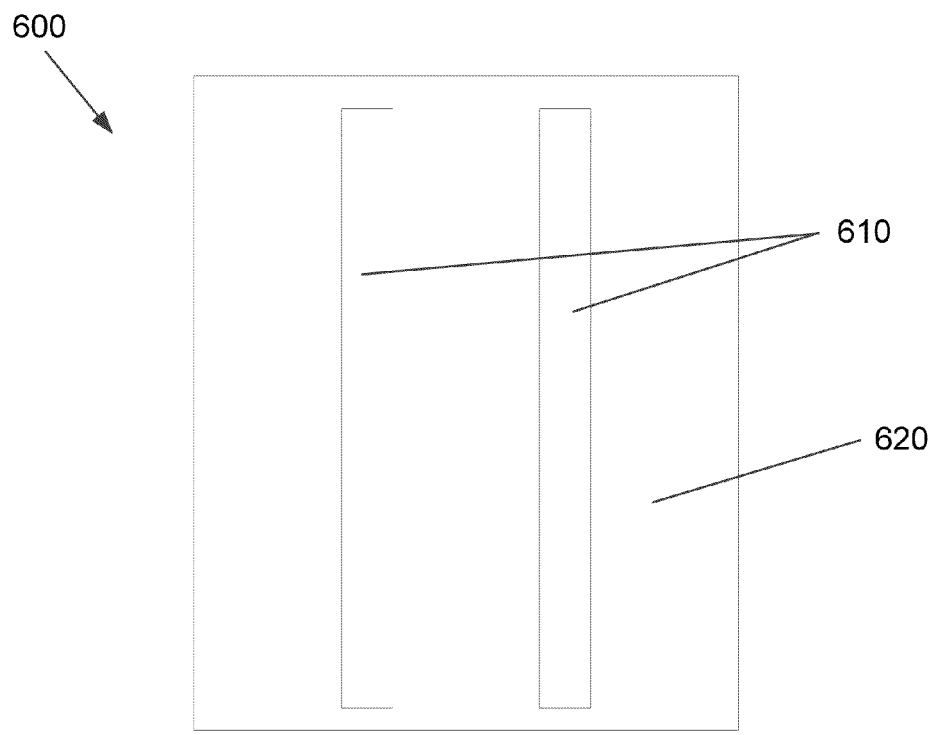
FIG. 6C illustrates a top view of the locking and spacing tool, according to an embodiment of the present invention.

FIG. 6B illustrates a top view of locking tool and spacer 600, according to an embodiment of the present invention. FIG. 6C illustrates a side view of locking tool and spacer 600, according to an embodiment of the present invention. As can be seen, rails 610 are attached to the top of spacer 620. Rails 610 may be formed when locking tool and spacer 600 is molded or cast and may be an integral part of the same casting. Rails 610 are integrated in a single piece with spacer 620, or attached to spacer 620 by any other suitable means.

Figure 7:
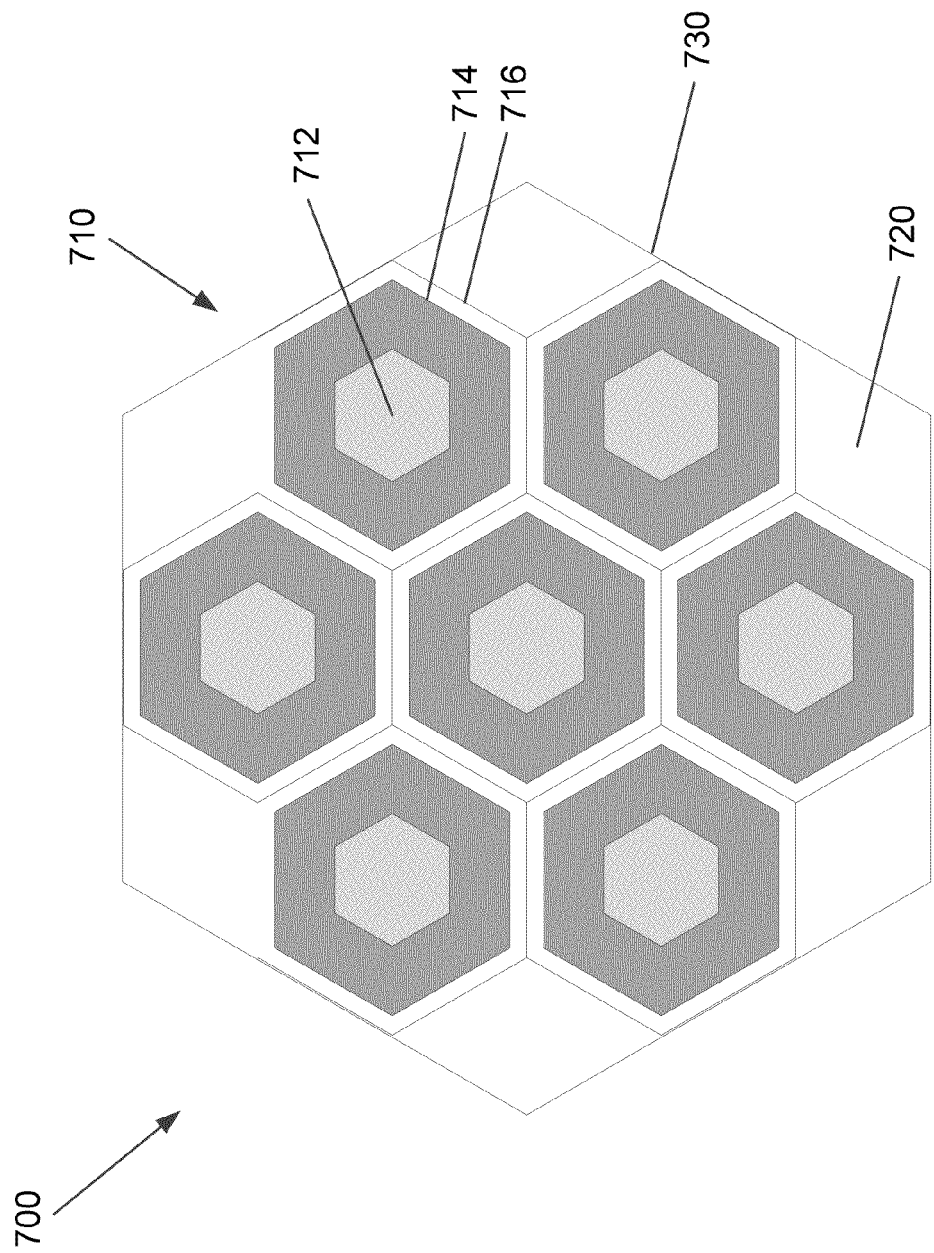
FIG. 7 illustrates a top view of a grid of cells included in a tray, according to an embodiment of the present invention.

FIG. 7 illustrates a top view of a grid of cells 700 included in a tray, according to an embodiment of the present invention. A plurality of hexagonal cells 710 make up grid of cells 700. Each of hexagonal cells 710 includes a thermal storage medium 712, a thermal transfer medium 714, and a lip 716. Thermal transfer medium 714 may be positioned in a recess, such as that shown in FIG. 5A. Individual cells 710 within grid of cells 700 may be interlocked and separated from subsequent layers via a locking and spacing tool such as that depicted in FIGS. 6A-C.

In this embodiment, grid of cells 700 is positioned so as to closely fit within a hexagonal core 730. Non-cell sections 720 may be filled with a material such as refractory, filled with a gas such as an inert gas, or filled with nothing (constituting a vacuum). In some embodiments, the energy delivery and/or energy extraction piping networks may be positioned within non-cell sections 720, and/or be within the inner layer of the thermal storage unit.

Figure 8:
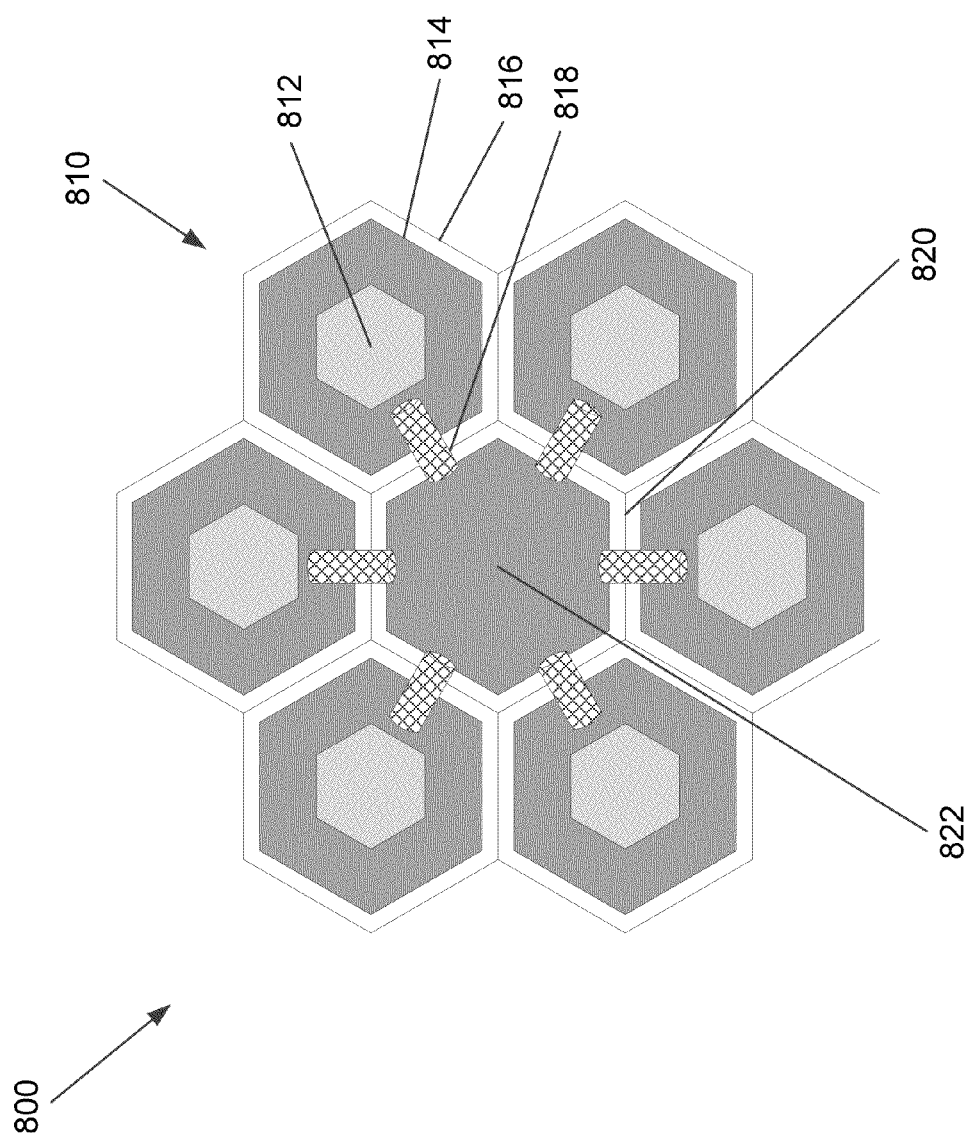
FIG. 8 illustrates a top view of a grid of cells included in a tray with a thermal transfer pipe passing through the center, according to an embodiment of the present invention.

FIG. 8 illustrates a top view of a grid of cells 800 included in a tray with a thermal transfer pipe 820 passing through the center, according to an embodiment of the present invention. A plurality of hexagonal cells 810 make up grid of cells 800. Each of hexagonal cells 810 includes a thermal storage medium 812, a thermal transfer medium 814, and a lip 816. Thermal transfer medium 814 may be positioned in a recess, such as that shown in FIG. 5A. Individual cells 810 within grid of cells 800 may be interlocked and separated from subsequent layers via a locking and spacing tool such as that depicted in FIGS. 6A-C.

Each of cells 810 is interconnected to thermal transfer pipe 820 via a respective connector pipe 818. Connector pipe 818 is positioned within thermal transfer medium 814, passes through the wall under lip 816, passes through the wall of thermal transfer pipe 820, and into a thermal transfer medium 822 within thermal transfer pipe 820. The materials of the thermal transfer media and thermal storage media may be similar to others discussed throughout this disclosure. In some embodiments, thermal transfer pipe 820 may be used for one or more of thermal energy delivery and extraction.

Figure 9:
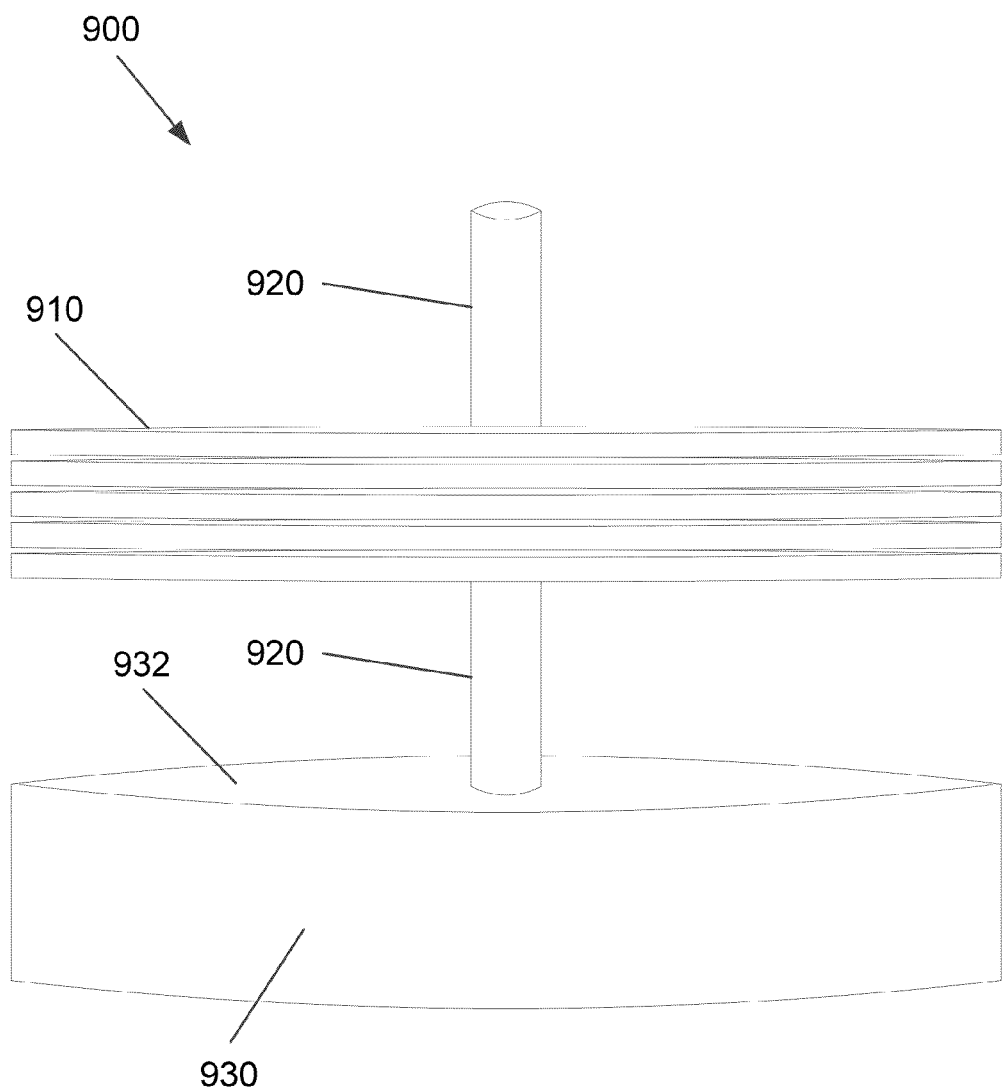
FIG. 9 illustrates an exploded view of multiple trays, a ceramic pipe, and a dropout chamber, according to an embodiment of the present invention.

FIG. 9 illustrates an exploded view 900 of multiple trays 910, a ceramic pipe 920, and a dropout chamber 930, according to an embodiment of the present invention. In some embodiments, the components of FIG. 9 may be part of thermal storage units 200 or 300 of FIGS. 2 and 3, respectively. Ceramic pipe 920 passes through trays 910 and down into dropout chamber 930. Ceramic pipe 920 is filled with a thermal transfer medium, such as silicon carbide (SiC) spheres with boron nitride (BN) microspheres to increase the thermal density and to increase the thermal transfer to trays 910. Ceramic pipe 920 is gas tight and thus, thermal transfer takes place by means of thermal radiation away from ceramic pipe 920 into trays 910 in the interior cavity. In some embodiments, the thermal transfer medium includes high purity helium, argon, or other inert gases that include SiC and BN microspheres in suspension.

Ceramic pipe 920 passes down into dropout chamber 930, which may contain helium, argon, or other inert gases with SiC and BN microspheres in suspension in some embodiments. High purity helium, argon, or other inert gases are allowed to pass through gas-selective cover 932, and the helium, argon, or other inert gases then percolate upward through the remainder of the interior cavity dispersing or collecting energy, depending on whether the thermal storage unit is receiving or discharging energy.

FIG. 9 exaggerates the layers and sections of the thermal core. However, in many embodiments, plates 910 are continuously stacked from the top of dropout chamber 930 to the top of the interior cavity (see FIGS. 2 and 3). Helium, argon, or other inert gases pass through gas selective cover 932 of dropout chamber 930 up into trays 910. Trays 910 are not gas tight when stacked in this embodiment. Accordingly, the gas passes up and around trays 910 in order to come into contact with as much of the surface area as possible. This enhances energy delivery or collection, depending on whether the thermal storage unit is in charging mode or discharging mode.

Figure 10A:
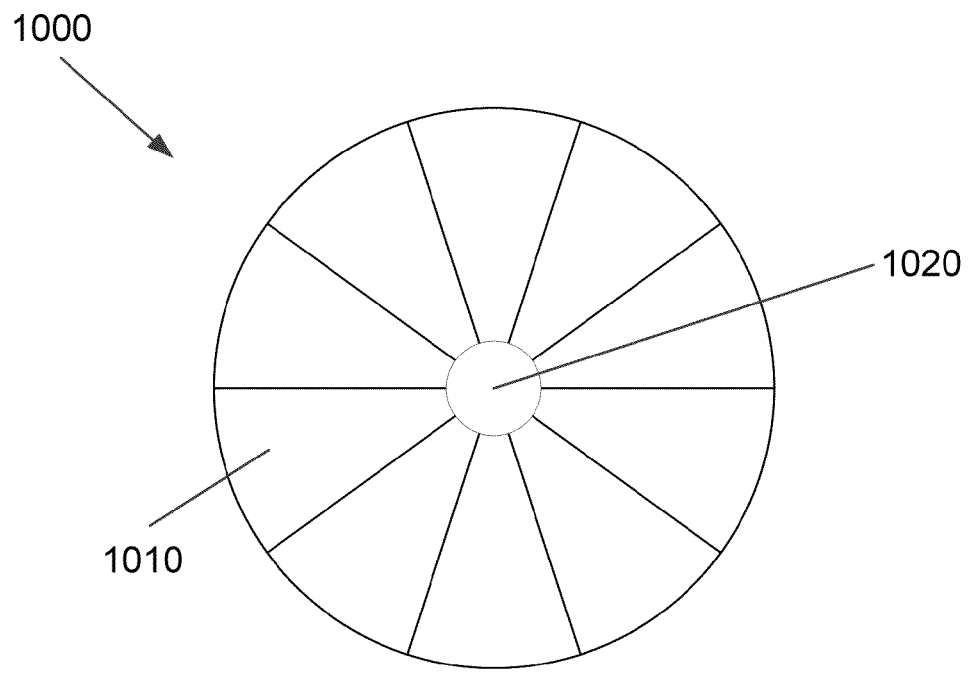
FIG. 10A illustrates a top view of a tray including a plurality of retaining troughs, according to an embodiment of the present invention.
Figure 10B:
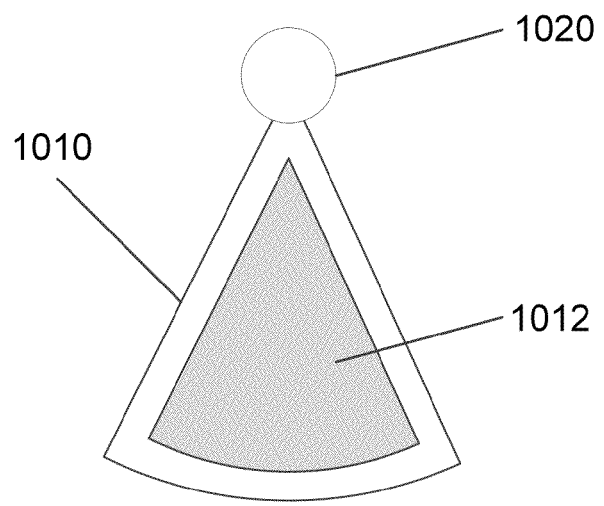
FIG. 10B illustrates a retaining trough with a cavity, according to an embodiment of the present invention.

FIG. 10A illustrates a top view of a tray 1000 including a plurality of retaining troughs 1010, according to an embodiment of the present invention. Unlike FIGS. 5A-B, 7, and 8, in this embodiment, tray 1000 is round rather than polygonal. In some embodiments, tray 1000 may be included in trays 270 or 370 of thermal storage units 200 or 300 of FIGS. 2 and 3, respectively. Retaining troughs 1010 capture and retain a thermal storage medium. Ceramic pipe 1020 passes through the center of tray 1000. For example, in some embodiments, tray 1000 may have ten retaining troughs 1010. In some embodiments, tray 1000 is constructed from glass, a combination of glass and metal, SiC, molded carbon, graphite, a combination thereof, or any other suitable material, depending on the intended operating temperature range for the thermal storage unit.

Where an operating temperature of up to 1200° C. is desired, tray 1000 may be constructed from glass or glass with copper, for example. The glass may include $Si_2O_3$ derived from recycled glass, which generally has a melting temperature of between 1600 and 1700° C. This glass material may have a boiling temperature of over 2200° C. In this example embodiment, copper or copper alloy (having a melting temperature of between 800 and 1000° C.) exhibits phase transformation. As such, inclusion of a cavity 1012 within retaining trough 1010 may be desirable, as illustrated in FIG. 10B. Cavity 1012 retains the molten material.

At temperatures of operation of up to between 1250° C. and 1700° C., the trays may be constructed from a ceramic material such as SiC or SiC ceramic composite, for example, and may include a metal such as nickel or nickel alloy. At these temperatures of operation, the thermal storage medium will generally have a phase change in the nickel or nickel alloy, but there will not be a phase change in the ceramic.

At temperatures of operation of up to 2800° C., tray 1000 may be constructed from molded carbon or graphite as both the nickel and SiC will exhibit a phase change. Tray 1000 should retain its form even at high temperatures such that the thermal storage medium is retained in the tray until such a time as the energy needs to be discharged and both the metal and the ceramic exhibit a phase change in the opposite direction—namely, back to a solid state. Depending on the desired temperature of operation, any tray material and thermal storage medium may be selected such that tray 1000 remains in a solid state while the thermal storage medium undergoes a phase change.

Per the above, some embodiments of the present invention are solid state and the only moving parts are externally located switches, controllers, and the like that control the direction and rate of the flow of thermal energy. Such switches or valves may be ball valves, "Y" switches, male/female unions, etc. These switches may be especially useful in a cluster configuration. The socket is positioned where the ball is allowed to interconnect tubes of the solid state thermal transfer medium (e.g., that located within ceramic pipe 280 of FIG. 2) such that energy can be injected into or extracted from the thermal storage unit.

Figure 11:
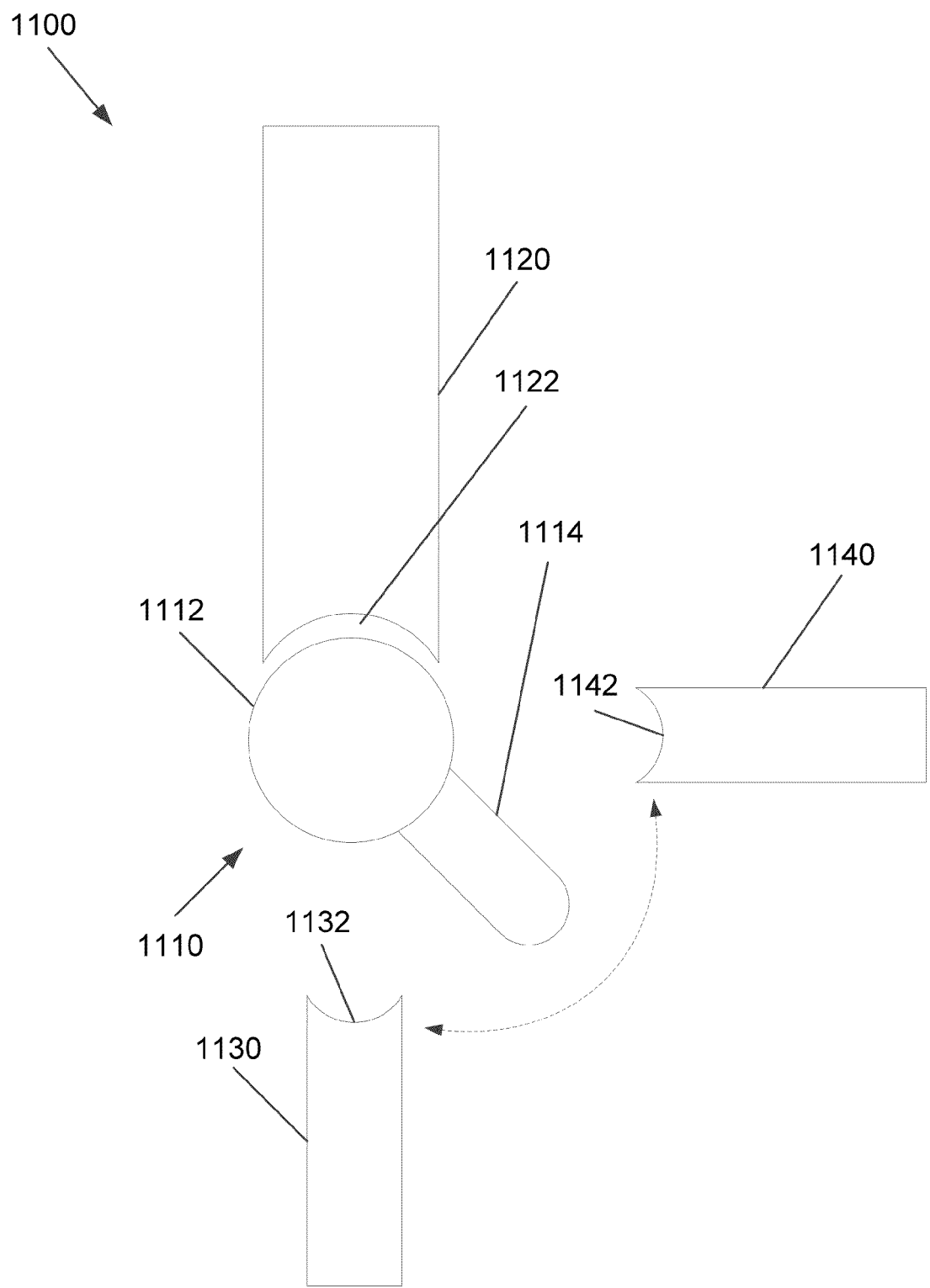
FIG. 11 illustrates a switch system, according to an embodiment of the present invention.

When the valve is rotated by a servo mechanism, for instance, the connection is broken and energy cannot be injected or extracted. There can be any number of connections depending on design parameters and the desired application. Each valve/switch can be activated independently and valves and switches can be internal or external—in other words, incorporated in or not incorporated in the thermal storage unit. The valve can be a ball and cup type with a male/female configuration where one member is static and the other member is mobile, as illustrated in FIG. 11. However, any suitable switch design can be used. Switches may be constructed out of different types of ceramics depending on the design and the desired application and may be controlled by the thermal storage unit's operating temperature and energy load. A valve/switch could be automatically activated based on design values, and be open at one temperature range and closed at another. Further, in some embodiments, thermodynamic forces such as the coefficient of expansion of various materials (e.g., metals) could be used as the motivating force. The valve/switch could also be motivated by electromagnetic or servo drives isolated from the extreme heat and linked by ceramics components that are poor transmitters of heat. The components may also be cooled to guard against high temperatures.

The control system could be monitored by thermal and pressure sensors and, regardless of whether the system is computer-controlled, such valves/switches may work interactively to achieve the collection or delivery of energy precisely and predictably. In certain embodiments based on thermal expansion, the design may be based on the expansion of certain metals that can reduce the surface area contact of the solid state thermal transfer medium. Such a design may be highly accurate. By using a mixture of alloys, a twisting action can be achieved that can quickly disengage the connecting solid state thermal transfer medium at a predetermined temperature. A less reactive switch can be constructed from ceramics since as the ceramics are heated, they are designed to slowly (or progressively) move the connection from one solid state conduit to another, thus redirecting the energy and, as the temperature drops, returning to the original flow.

Ceramic automatic valves/switches can be used to switch energy between thermal storage units in a cell configuration, for instance, once the internal or external temperature reaches a safe maximum (unlike like the metal switches where metal fatigue may in time cause the need for replacement). Such valves/switches can also control which section(s) of the thermal storage unit's core are charged first and which section(s) are discharged. The thermal transfer medium is generally integrated into a gas tight environment so the switches can be simple mechanical devices and a cup and ball coupling allows the switch to pivot between incoming and outgoing pipes that direct the energy to or from different locations, yet maintains a direct surface connection with the fixed cup (see FIG. 11). Tolerances would be calibrated for the close proximity of the ball to the cup and the connection interface after the pivot point to either the incoming or outgoing pipe. In some embodiments, the pipes would be closely calibrated to accommodate thermal expansion. The "hot" connection would have a larger clearance and the "cool" connection would have a smaller clearance. This design can also be an added safety feature as the hot fit would not fit properly (thus interconnect) until it cooled down to the correct temperature.

FIG. 11 illustrates a switch system 1100, according to an embodiment of the present invention. Switch system 1100 includes a switch 1110 that has a ball 1112 and a coupling 1114 that move with thermal expansion. The ceramic shape of switch 1110 is selected for its expansion properties. Ball 1112 is situated within a socket 1122 at the end of ceramic pipe 1120.

Expansion and contraction of switch 1110 create a locomotive force that moves coupling 1114. For instance, when below a certain temperature, coupling 1114 is connected to pipe 1130 via socket 1132. However, as the temperature rises and the material expands, coupling 1114 moves towards, and eventually connects to, pipe 1140 via socket 1142. Similarly, as coupling 1114 cools, the coupling returns to socket 1132 of pipe 1130. In some embodiments, two ceramics may be used to move dynamic controls and switches and the switches could be cascaded to meet certain design needs. Thus, the energy flow would take the path of least resistance and the movement of energy could be accurately predicted and controlled.

FIG. 12 is a flowchart 1200 illustrating a method for charging and discharging a thermal storage unit, according to an embodiment of the present invention. The method begins with determining whether the thermal storage unit is sufficiently charged at 1205. If the thermal storage unit is not sufficiently charged at 1205, the flow proceeds to the charging branch. If the thermal storage unit is sufficiently charged at 1205, the flow proceeds to the discharging branch. Per the above, while not shown here, in some embodiments, charging and discharging may take place simultaneously.

If the thermal storage unit is not sufficiently charged at 1205, a determination of whether to charge the thermal storage unit is made at 1210. If charging of the thermal storage unit is not desired at 1210, the process ends. However, if charging of the thermal storage unit is desired at 1210, the process proceeds to directing thermal energy from an external source from a thermal transfer medium to a core of a thermal storage unit at 1215. The temperature of the core of the thermal storage unit is then raised to the desired storage temperature at 1220. In some embodiments, a thermal storage medium may undergo a phase change from a solid state to a liquid state. Once the desired storage temperature is reached, provision of thermal energy ceases at 1225 and the process ends.

If the thermal storage unit is sufficiently charged at 1205, a determination of whether to discharge the thermal storage unit is made at 1230. If discharging of the thermal storage unit is not desired at 1230, the process ends. However, if discharging of the thermal storage unit is desired at 1230, the process proceeds to applying thermal energy from the core to do external work at 1235. The thermal energy is used to do work at 1240 until the work is completed or the thermal energy is exhausted. The thermal storage unit then stops applying thermal energy at 1245 and the process ends.

Some embodiments of the present invention pertain to a thermal storage and delivery system that is capable of storing thermal energy via a high temperature core. The core may include multiple trays, and each tray may further include multiple thermal storage cells that facilitate thermal storage and delivery. The thermal storage and energy delivery system may include multiple layers surrounding the core, where each progressive layer is less dense from the inner layer to the outer layer. The layers may also have more insulative and less refractory properties the further they are from the core. The outer layer may be enclosed in a casing that may be pressure rated to adequately contain the contents of the thermal storage and delivery system.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

I claim:

1. An apparatus, comprising:
a core comprising a thermal storage medium;
a plurality of layers surrounding the core, wherein the innermost layer has the highest density and each successive layer has a lower density than the layer it surrounds; and
a thermal transfer medium that transports thermal energy to and from the core, wherein
the core comprises a plurality of trays comprising the thermal storage medium, and the plurality of trays is configured to store thermal energy.

2. The apparatus of claim 1, wherein one or more materials of the thermal storage medium are configured to undergo a phase change from a solid state to a liquid state when the thermal storage medium receives a sufficient amount of thermal energy via the thermal transfer medium, and the one or more materials remain in the liquid state while the apparatus is operationally storing thermal energy.

3. The apparatus of claim 1, wherein at least one of the trays comprises a plurality of thermal storage cells.

4. The apparatus of claim 3, wherein at least one thermal storage cell comprises the thermal transfer medium, and the thermal transfer medium is configured to transfer thermal energy to and from the corresponding thermal storage medium of the at least one thermal storage cell.

5. The apparatus of claim 4, wherein the at least one cell comprises a connector pipe configured to deliver thermal energy to the at least one thermal storage cell, extract energy from the at least one thermal storage cell, or both.

6. The apparatus of claim 1, wherein the thermal storage medium comprises nickel and the thermal transfer medium comprises a graphite foam.

7. The apparatus of claim 1, wherein the apparatus is configured to receive thermal energy from an infrared spectrum energy collection source.

8. A thermal storage unit, comprising:
   a core comprising a thermal storage medium;
   a plurality of layers surrounding the core, wherein the innermost layer has the highest density and each successive layer has a lower density than the layer it surrounds; and
   a thermal transfer medium that passes through the plurality of layers and is configured to deliver thermal energy to and extract thermal energy from the thermal storage medium.

9. The thermal storage unit of claim 8, wherein the core comprises a plurality of trays comprising the thermal storage medium, the trays configured to store thermal energy.

10. The thermal storage unit of claim 9, wherein at least one of the trays comprises a plurality of thermal storage cells.

11. The thermal storage unit of claim 10, wherein at least one thermal storage cell comprises the thermal transfer medium, and the thermal transfer medium is configured to transfer thermal energy to and from the corresponding thermal storage medium of the at least one thermal storage cell.

12. The thermal storage unit of claim 11, wherein the at least one cell comprises a connector pipe configured to deliver thermal energy to the at least one thermal storage cell, extract energy from the at least one thermal storage cell, or both.

13. The thermal storage unit of claim 8, wherein the thermal storage medium comprises nickel and the thermal transfer medium comprises a graphite foam.

14. An apparatus, comprising:
    a core comprising a plurality of trays that contain a thermal storage medium;
    a plurality of layers surrounding the core, wherein each successive layer away from the core has less refractory and more insulating properties than the preceding layer, such that an innermost layer has the most refractory properties and an outermost layer has the most insulative properties; and
    a pipe comprising a thermal transfer medium that is configured to transfer heat to and from the core.

15. The apparatus of claim 14, wherein the core comprises a plurality of trays comprising the thermal storage medium, the trays configured to store thermal energy.

16. The apparatus of claim 15, wherein at least one of the trays comprises a plurality of thermal storage cells.

17. The apparatus of claim 16, wherein at least one thermal storage cell comprises the thermal transfer medium, and the thermal transfer medium is configured to transfer thermal energy to and from the corresponding thermal storage medium of the at least one thermal storage cell.

18. The apparatus of claim 17, wherein the at least one cell comprises a connector pipe configured to deliver thermal energy to the at least one thermal storage cell, extract energy from the at least one thermal storage cell, or both.

19. The apparatus of claim 14, wherein the thermal storage medium comprises nickel and the thermal transfer medium comprises a graphite foam.

\* \* \* \* \*